US010956586B2

(12) United States Patent
Sadeh et al.

(10) Patent No.: US 10,956,586 B2
(45) Date of Patent: Mar. 23, 2021

(54) PERSONALIZED PRIVACY ASSISTANT

(71) Applicant: Carnegie Mellon University, Pittsburgh, PA (US)

(72) Inventors: Norman Sadeh, Pittsburgh, PA (US); Bin Liu, Pittsburgh, PA (US); Anupam Das, Pittsburgh, PA (US); Martin Degeling, Pittsburgh, PA (US); Florian Schaub, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 267 days.

(21) Appl. No.: 15/858,261

(22) Filed: Dec. 29, 2017

(65) Prior Publication Data
US 2019/0108353 A1 Apr. 11, 2019

Related U.S. Application Data

(63) Continuation-in-part of application No. 15/658,204, filed on Jul. 24, 2017, now abandoned.
(Continued)

(51) Int. Cl.
*H04L 29/06* (2006.01)
*G06F 21/60* (2013.01)
(Continued)

(52) U.S. Cl.
CPC .......... *G06F 21/604* (2013.01); *G06F 21/629* (2013.01); *G06F 21/6245* (2013.01);
(Continued)

(58) Field of Classification Search
CPC combination set(s) only.
See application file for complete search history.

(56) References Cited

U.S. PATENT DOCUMENTS 7,810,153 B2 * 10/2010 Perlin ..................... G06F 21/31
726/16
9,374,379 B1 * 6/2016 Hew ..................... H04L 63/108
(Continued)

OTHER PUBLICATIONS

Almuhimedi, et al., "Your Location has been Shared 5,398 Times! A Field Sudy on Mobile App Privacy Nudging," ACM 978-1-4503-3145-6/15/04, 10 pages.
(Continued)

*Primary Examiner* — Malcolm Cribbs
(74) *Attorney, Agent, or Firm* — K&L Gates LLP

(57) ABSTRACT

A system and method configures permission settings for applications ("apps") running on a computing device of a user. A data center generates at least one model of collective privacy preferences. The computing device is in communication with the data center via a communications network. The computing device comprises a processor that execute at least a first app that requests access to at least one permission of the computing device and a personal privacy assistant app. The personal privacy assistant app receives the at least one model from the one or more servers of the data center; collects information about the user; identifies at least one recommended permission setting for the first app based on the at least one model and such that the recommended permission setting is user-specific; and configures the computing device to implement the received at least one user-specific recommended permission setting.

78 Claims, 21 Drawing Sheets

Related U.S. Application Data

(60) Provisional application No. 62/493,972, filed on Jul. 22, 2016.

(51) Int. Cl.
    *G06N 7/00* (2006.01)
    *G06F 21/62* (2013.01)
    *G06N 20/00* (2019.01)
    *H04L 29/08* (2006.01)

(52) U.S. Cl.
    CPC .............. *G06N 7/00* (2013.01); *G06N 20/00* (2019.01); *H04L 63/101* (2013.01); *H04L 63/102* (2013.01); *H04L 67/306* (2013.01); *H04L 67/12* (2013.01); *H04L 67/22* (2013.01)

(56) References Cited

U.S. PATENT DOCUMENTS

| | | | | |
|---|---|---|---|---|
| 2003/0023726 A1* | 1/2003 | Rice | ............ | H04W 8/16 709/225 |
| 2005/0273841 A1* | 12/2005 | Freund | ............ | G06F 21/57 726/1 |
| 2006/0174334 A1* | 8/2006 | Perlin | ............ | G06F 21/6218 726/9 |
| 2007/0113270 A1* | 5/2007 | Kraemer | ............ | G06F 21/604 726/4 |
| 2008/0120339 A1* | 5/2008 | Guan | ............ | G06Q 10/10 |
| 2012/0317609 A1* | 12/2012 | Carrara | ............ | G06F 21/6218 726/1 |
| 2012/0330777 A1* | 12/2012 | Sathish | ............ | G06Q 30/02 705/26.7 |
| 2013/0055411 A1* | 2/2013 | Yang | ............ | H04W 12/08 726/30 |
| 2013/0103628 A1* | 4/2013 | Skelton | ............ | G06Q 30/0277 706/46 |
| 2013/0198849 A1* | 8/2013 | Aad | ............ | G06F 8/33 726/26 |
| 2014/0059695 A1* | 2/2014 | Parecki | ............ | G06F 21/60 726/26 |
| 2014/0214610 A1* | 7/2014 | Moshir | ............ | G06Q 20/4016 705/26.35 |
| 2014/0229498 A1* | 8/2014 | Dillon | ............ | G06Q 30/0631 707/767 |
| 2016/0191534 A1* | 6/2016 | Mallozzi | ............ | G06F 21/6218 726/4 |
| 2017/0011215 A1* | 1/2017 | Poiesz | ............ | G06F 21/52 |

OTHER PUBLICATIONS

Das et al., "Assisting Users in a World Full of Cameras: A Privacy-aware Infrastructure for Computer Vision Applications," 2017 IEEE Conference on Computer Vision and Pattern Recognition Workshops (CVPRVV), Jul. 2017, 12 pages.

Fan, et al., "Liblinear: A library for large linear classification," The Journal of Machine Learning Research, 9:1871-1874, 2008, 30 pages.

Lin, et al., "Modeling Users' Mobile App Privacy Preferences: Restoring Usability in a Sea of Permission Settings," Symposium on Usable Privacy and Security (SOUPS) Jul. 9-11, 2014, Menlo Park, CA, 14 pages.

Liu, et al., "Follow My Recommendations: A Personlized Privacy Assistant for Mobile App Permissions," Symposium on Usable Privacy and Security (SOUPS) Jun. 222-24, 2016, Denver, Colorado, 16 pages.

Liu, et al., "Reconciling Mobile App Privacy and Usability on Smartphones: Could User Privacy Profiles Help?" accepted for publication in the proceedings of the 23$^{rd}$ International World Wide Web Conference (www2014) Dec. 2013, 12 pages.

Mugan, et al., "Understandable Learning of Privacy Preferences through Default Personas and Suggestions," Carnegie Mellon University's School of Computer Science Technical Report CMUISR-11-112, Aug. 2011 (31 pages).

Ravichandran, et al., "Capturing Social Networking Privacy Preferences: Can Default Policies Help Alleviate Tradeoffs between Expressiveness and User Burden?", Proceedings of the 2009 Privacy Enhancing Technologies Symposium, Aug. 2009 (2 pages).

Schaub, et al., "A Design Space for Effective Privacy Notices," Symposium on Usable Privacy and Security (SOUPS) 2015, Jul. 22-24, Ottawa, Canada, 17 pages.

Wilson, et al., "Privacy Manipulation and Acclimation in a Location Sharing Application," UbiComp'13, Sep. 8-12, 2013, Zurich, Switzerland, 10 pages.

* cited by examiner

Fig. 10

Collective Privacy Preference Profile for Cluster 1 (4000)

| | Permission 1 | Permission 2 | Permission 3 |
|---|---|---|---|
| App Category 1 | Grant | No Recommendation | Deny |
| App Category 2 | Grant | Deny | Grant |
| App Category 3 | No Recommendation | No Recommendation | Grant |

Individual Privacy Preference Model (5000) for User 1 (originally assigned to Cluster 1) along with specific permission settings selected by User 1 based on recommendations and later decisions

| | Permission 1 | Permission 2 | Permission 3 |
|---|---|---|---|
| App Category 1 | Grant | No Recommendation | Deny |
| App 11 | Grant | Deny | Deny |
| App 12 | Grant | Grant | Deny |
| App Category 2 | Grant | Deny | Deny** |
| App 21 | Grant | Grant | Deny* |
| App Category 3 | No Recommendation | No Recommendation | Deny** |

* denotes deviations from Cluster 1 where User 1 rejected a recommendation
** denotes a refinement of the model for User 1. Here, when User 1 rejected the 'Grant' recommendation for App 21 and Permission 3 he was simply asked whether he always wanted to reject Permission 3. Alternatively this could have been inferred.

Fig. 11

| | Permission 1 Granted | Permission 2 Granted | Permission 1 Denied | Permission 2 Denied |
|---|---|---|---|---|
| App Category 1 | | | | |
| App 11 | | Works | Works | Not Applicable |
| App 12 | | Crashes | Users Report Problems | Works |
| App Category 2 | | | | |
| App 21 | | Not Applicable | Works except for navigation functionality | Crashes |
| App Category 3 | | | | |
| App 31 | | Works but can't scan bar codes | Not applicable | Not applicable |
| App 32 | | Works | Not Applicable | Works |

113

Note: Not applicable denotes a permission that is not requested by a given app

Cluster 1

| | Permission 1 | Permission 2 | Permission 3 |
|---|---|---|---|
| App Category 1 | Grant | No Recommendation | Deny |
| App Category 2 | Grant | Deny | Deny |
| App Category 3 | No Recommendation | No Recommendation | Grant |

Cluster 2

| | Permission 1 | Permission 2 | Permission 3 |
|---|---|---|---|
| App Category 1 | Deny | Deny | Deny |
| App Category 2 | Grant | Deny | Deny |
| App Category 3 | Deny | No Recommendation | Deny |

Fig 14

|  | Permission 1 | | | Permission 2 | | |
|---|---|---|---|---|---|---|
|  | Purpose 1 | Purpose 2 | Purpose 3 | Purpose 1 | Purpose 2 | Purpose 3 |
| App Category 1 | Grant | No recommendation | No recommendation | Deny | No Recommendation | No recommendation |
| App Category 2 | Deny | Grant | No recommendation | Grant | Grant | Deny |
| App Category 3 | Deny | Deny | Grant | Grant | Grant | No recommendation |

Fig 15

|  | Permission 1 | | | Permission 2 | | |
|---|---|---|---|---|---|---|
|  | Context 1 | Context 2 | Context 3 | Context 1 | Context 4 | Context 5 |
| App Category 1 | Grant | No recommendation | Grant Low Fidelity Access | Deny | Deny | No recommendation |
| App Category 2 | Deny | Grant Restricted Access | No recommendation | Grant | Grant | Deny |
| App Category 3 | Deny | Falsify | Grant Restricted Access | Grant | Grant | No recommendation |

Fig 16

PERSONALIZED PRIVACY ASSISTANT

PRIORITY

The present application claims priority as a continuation-in-part to U.S. nonprovisional patent application Ser. No. 15/658,204, filed Jul. 24, 2017, entitled "Personalized Privacy Assistant," which claims priority to U.S. provisional patent application Ser. No. 62/493,972, filed Jul. 22, 2016, both of which are incorporated herein by reference in their entirety.

STATEMENT REGARDING FEDERALLY SPONSORED RESEARCH AND DEVELOPMENT

This invention was made with government support under CNS1012763, CNS1330596, and SBE1513957 awarded by the National Science Foundation and FA8750-15-2-0277 awarded by the Air Force Research Laboratory/DARPA. The government has certain rights in the invention.

BACKGROUND

Mobile app ecosystems such as Android or iOS compete in part based on the number, and the quality of apps they offer. To attract developers and help generate more apps, these platforms have exposed a growing number of Application Programming Interfaces (APIs). These APIs provide access to smartphone functionality (e.g., GPS, accelerometer, camera) and user data (e.g., unique identifiers, location, social media accounts), much of which is privacy-sensitive.

The Android and iOS platforms both rely on permission-based mechanisms that allow users to control access to sensitive data and functionality. While providing users with this level of control is important, the end result is an unwieldy number of app-permission decisions that users are expected to make. Estimates indicate that users, on average, have to make over one hundred permission decisions (e.g., typical users may have 50 installed apps on their phones, with many apps requires 2 or more permissions). Prior work has shown that users are often unaware of, if not uncomfortable with many of the permissions they have ostensibly consented to at some point.

This situation is not unique to mobile apps on smartphones. It reflects the increasingly diverse ways in which technologies can access sensitive data and functionality and the need for users to be able to control settings that determine which technology can access which element of functionality and which data under which conditions. Other examples include security and privacy settings found in browsers, privacy settings associated with social network sites and applications, as well as emerging privacy settings associated with Internet of Things Resources ("IoT resources"). Permissions such as those found in iOS and Android are a mechanism for providing users with such control. If all users felt the same way about which technology can access sensitive data or functionality such settings would not be required. Instead access could be configured to align with everyone's privacy preferences, namely their comfort in granting access to sensitive functionality and data under different conditions. Experiments show however that people's privacy preferences are diverse and that "one-size-fits-all" settings would often not do a good job at capturing these preferences, thus the need for user-configurable settings. As already pointed out the number of such settings has been growing and can be expected to continue to grow over time, leading to a situation where the number of such settings is unrealistically large for people to manage.

SUMMARY

The present invention revolves around, in one general aspect, personalized privacy assistant functionality that can help users configure privacy settings. This functionality is intended to reduce user burden and increase the accuracy with which people's permission settings reflect their actual privacy preferences. This functionality takes advantage of, preferably, machine learning and/or statistical analysis techniques and can be extended to a number of technologies and environments (e.g. configuring people's privacy settings in browsers, in Internet of Things (IoT) environments, on social networking sites and more). It can also be further extended to notifying users about privacy practices they may not be expecting or with which they are believed to be particularly uncomfortable, even when settings to turn them off or opt out of them are not available.

In one general aspect, therefore, the present invention is directed to systems and methods that configure permission settings for applications ("apps") running on a computing device of a user. The system may comprise a data center that generates at least one model of privacy preferences based on data collected from a population of user. The computing device is in communication with the data center via a communications network. The computing device comprises a processor that executes at least a first app that requests access to at least one permission of the computing device. The processor also executes the personal privacy assistant app. The personal privacy assistant app, in one embodiment, receives and stores locally the model from the data center. It also collects information about the user and, based thereon, identifies at least one recommended permission setting for the first app using the model and such that the recommended permission setting is user-specific. Then the personal privacy assistant app can configure the computing device to implement the recommended permission setting.

In another embodiment, the personal privacy assist collects the user information and transmits it to the data center, which identifies the recommended permission settings (s) and transmits them back the personal privacy app for configuration.

The personal privacy assistant can also be used for configuring user-specific privacy settings for IoT resources running on third party computing systems. For example, the system could comprise one or more IoT resources and at least a first IoT resources registry that advertises the one or more IoT resources. The personal privacy assistant running on the user's computing device receives from the first IoT resource registry data about the one or more IoT resources advertised by the IoT resource registry and configures user-specific permission settings for the one or more IoT resources based on the data received from the IoT resource registry and based on individual privacy preferences for the user stored by the personal privacy assistant. The data about the one or more IoT resources received by the personal privacy assistant may comprise privacy opt-in or privacy opt-out settings (or other privacy settings) available for the one or more IoT resources. The personal privacy assistant may communicate directly with the one or more IoT resources or with policy enforcement points associated with one or more IoT resources to configure the user-specific privacy settings for these one or more IoT resources.

Embodiments of the present invention can allow users to more accurately, efficiently and easily align the privacy-related permissions actually enforced by their computing devices with their privacy preferences. These and other benefits of the present invention will be apparent from the description below.

FIGURES

Various embodiments of the present invention are described herein by way of example in connection with the following figures.

FIG. 10 illustrates an example of how additional personalized questions can be asked of the user after the user accepts, rejects or modifies a recommended setting according to various embodiments of the present invention.

FIG. 11 illustrates example app performance data that can be used in making the recommended permission settings according to various embodiments of the present invention.

Figure 12:
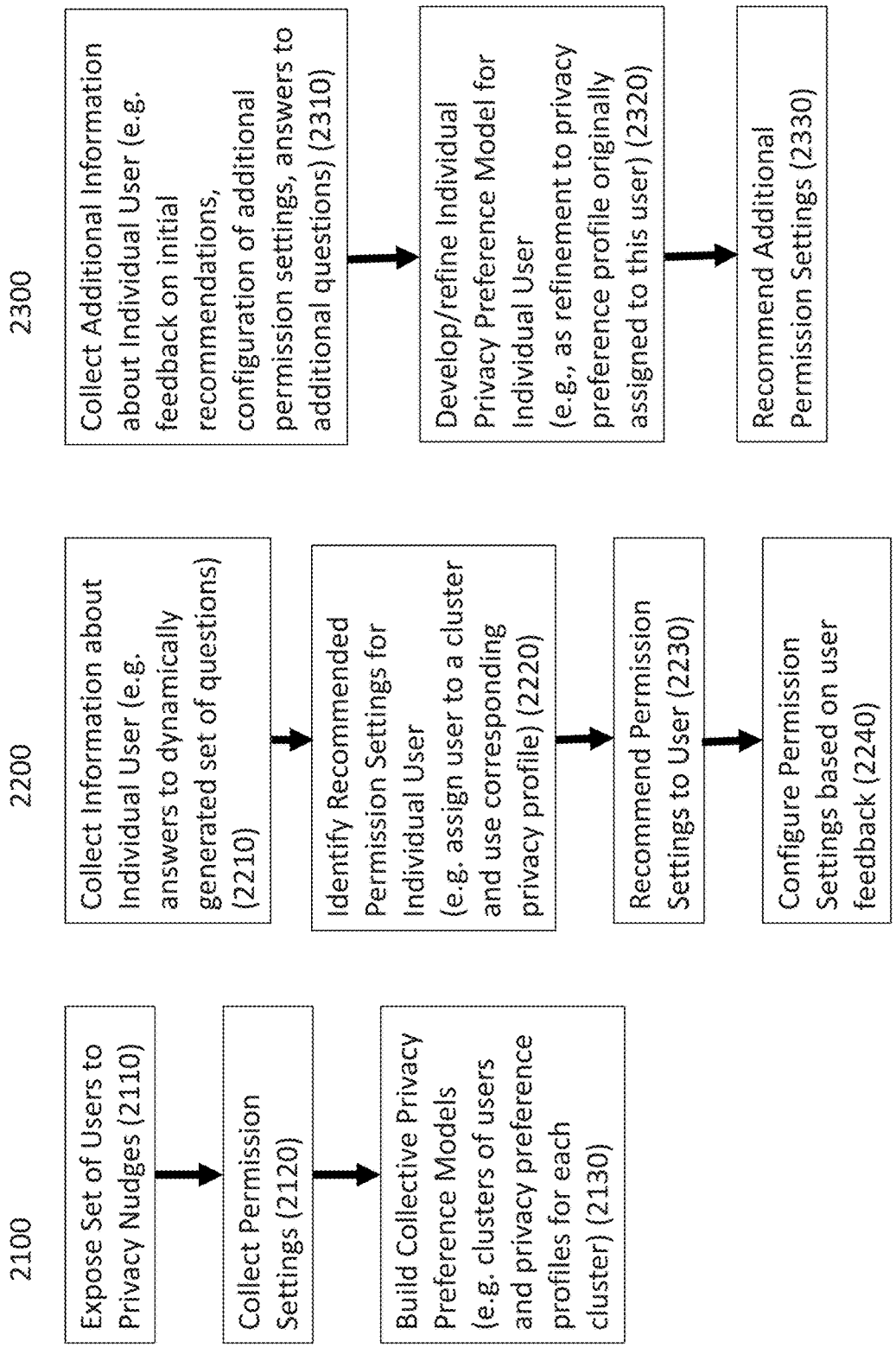
Figure 13:
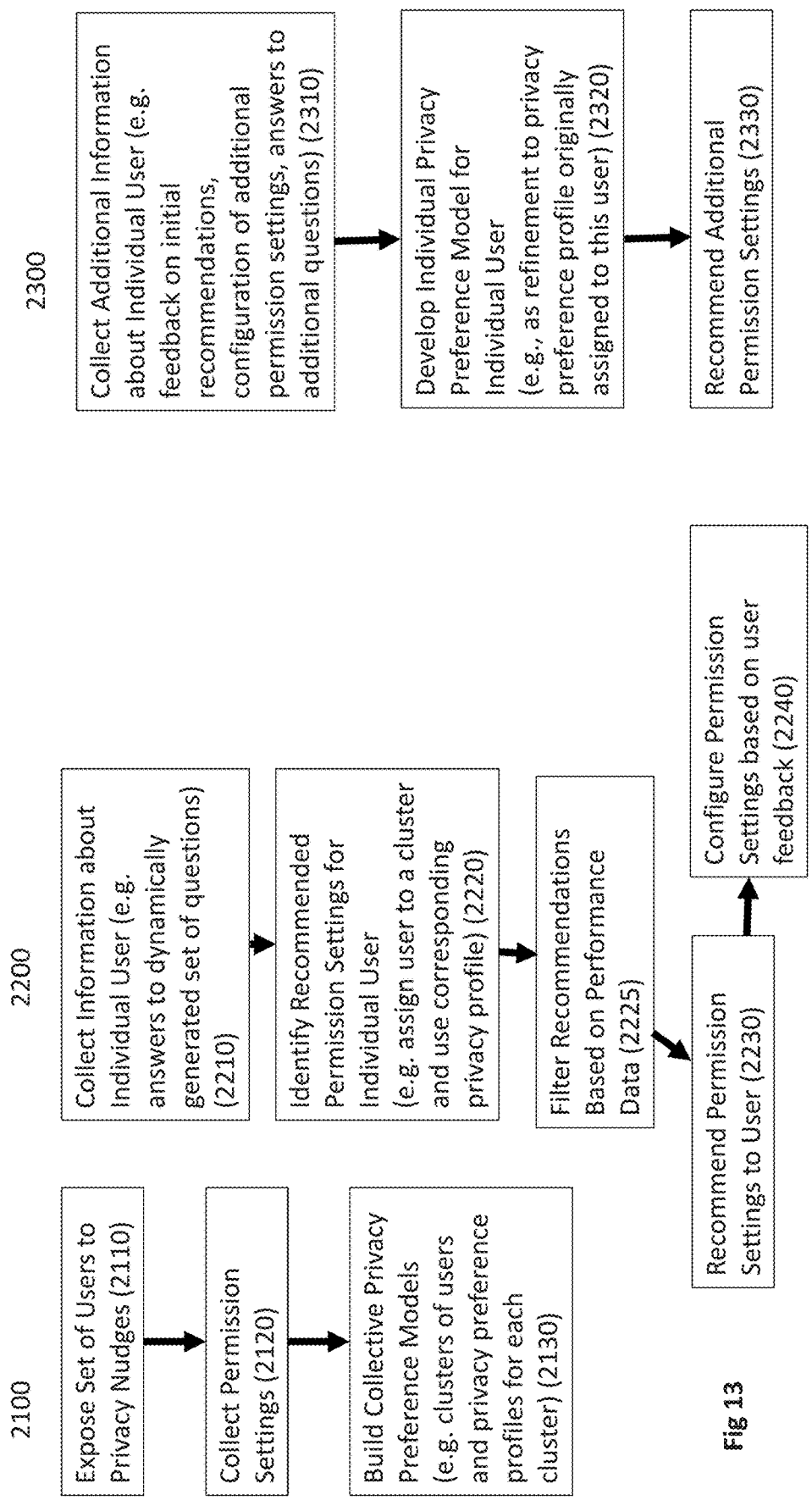

FIGS. 12 and 13 and flow charts illustrating example process flows for embodiments of the present invention.

FIGS. 14, 15, 16 illustrate example permission settings. FIG. 14 shows example permission settings for two different clusters. FIG. 15 illustrates example permission settings for a cluster where the purpose of the permission is used for the recommendations. And FIG. 16 illustrates example permission settings for a cluster where the context of the permission is used for the recommendations.

DESCRIPTION

In one general aspect, the present invention is directed to a personalized privacy assistant (PPA) that helps a user configure permission settings associated with technologies with which the user interacts. In one embodiment these technologies are applications ("apps") running on a computing device such as a mobile computing device, such as a laptop, a tablet, or a wearable computing device. In other embodiments these permission settings are associated with services with which the user interacts such as cloud-based services (e.g., social networking site) or other computing systems, applications or devices such as a location tracking system deployed in a building, a camera monitoring system deployed in a department store, or IoT devices, applications or systems deployed in one's home (e.g. Amazon echo or other home assistant technology), a robot, or a car fitted with a number of sensors and other subsystems.

The permission settings control access by these technologies (e.g. apps on a computing device, IoT service, IoT app, IoT device, etc.) to sensitive data or functionality. An example is a set of permissions that enable a mobile operating system to control access to sensitive functionality or data by apps running on a smartphone (e.g., access to location tracking functionality, access to camera functionality, access to microphone functionality, access to messaging functionality, access to contacts list information, access to a device's unique identifier, access to health information, etc.). In another example, permissions control privacy and/or security settings associated with a browser or control which sensitive functionality or data websites can access. In yet another example, permissions may be used to capture and enforce user-specific settings associated with Internet of Things (IoT) devices or services such as opt-in or opt-out privacy settings associated with location tracking functionality in an office building, or permission to apply facial recognition functionality or scene recognition functionality to footage captured by a video monitoring system in a mall.

Figure 1A:
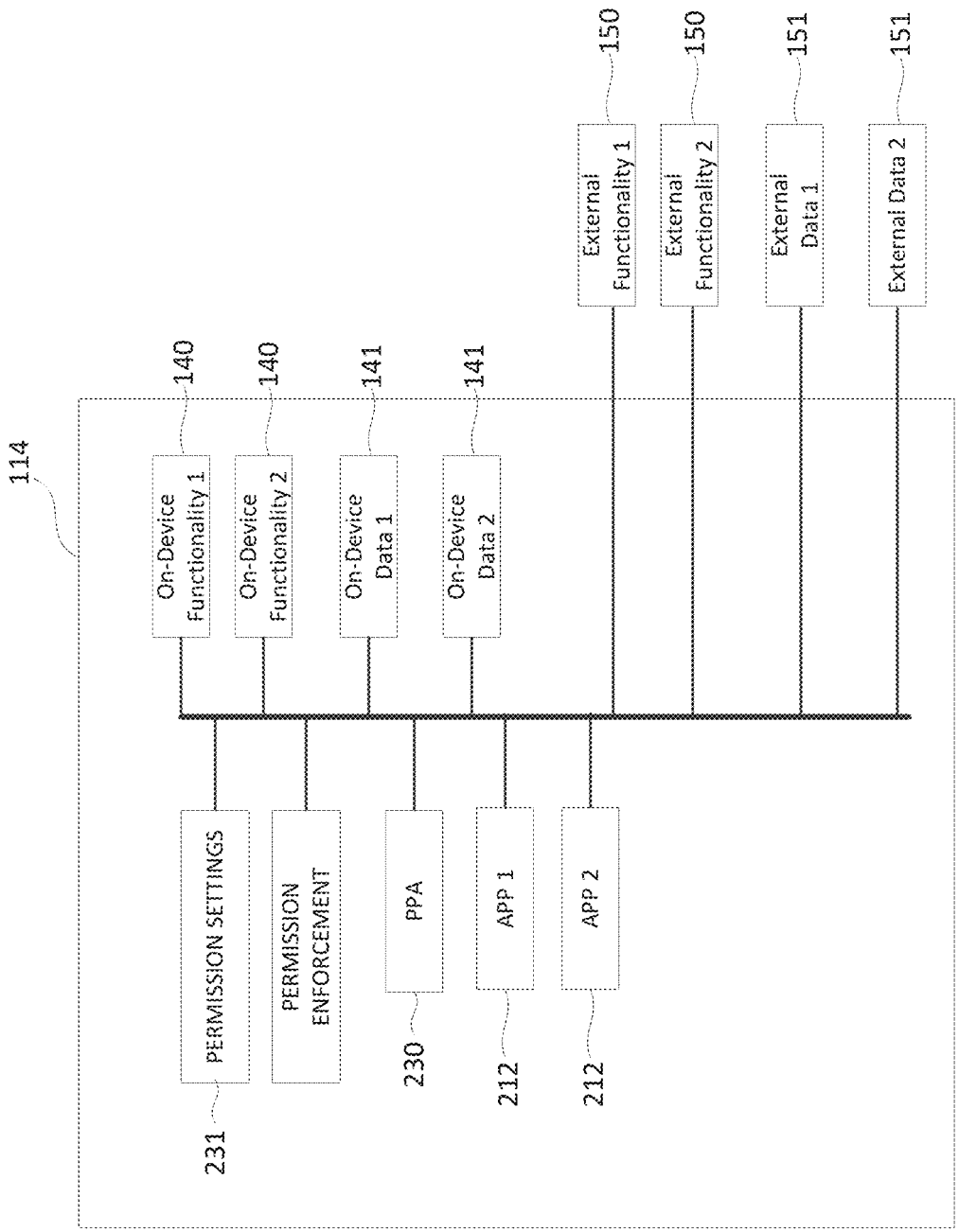
FIGS. 1A and 1B are diagrams illustrating two different ways of deploying a personalized privacy assistant to help users configure privacy settings according to various embodiments of the present invention.
Figure 1B:
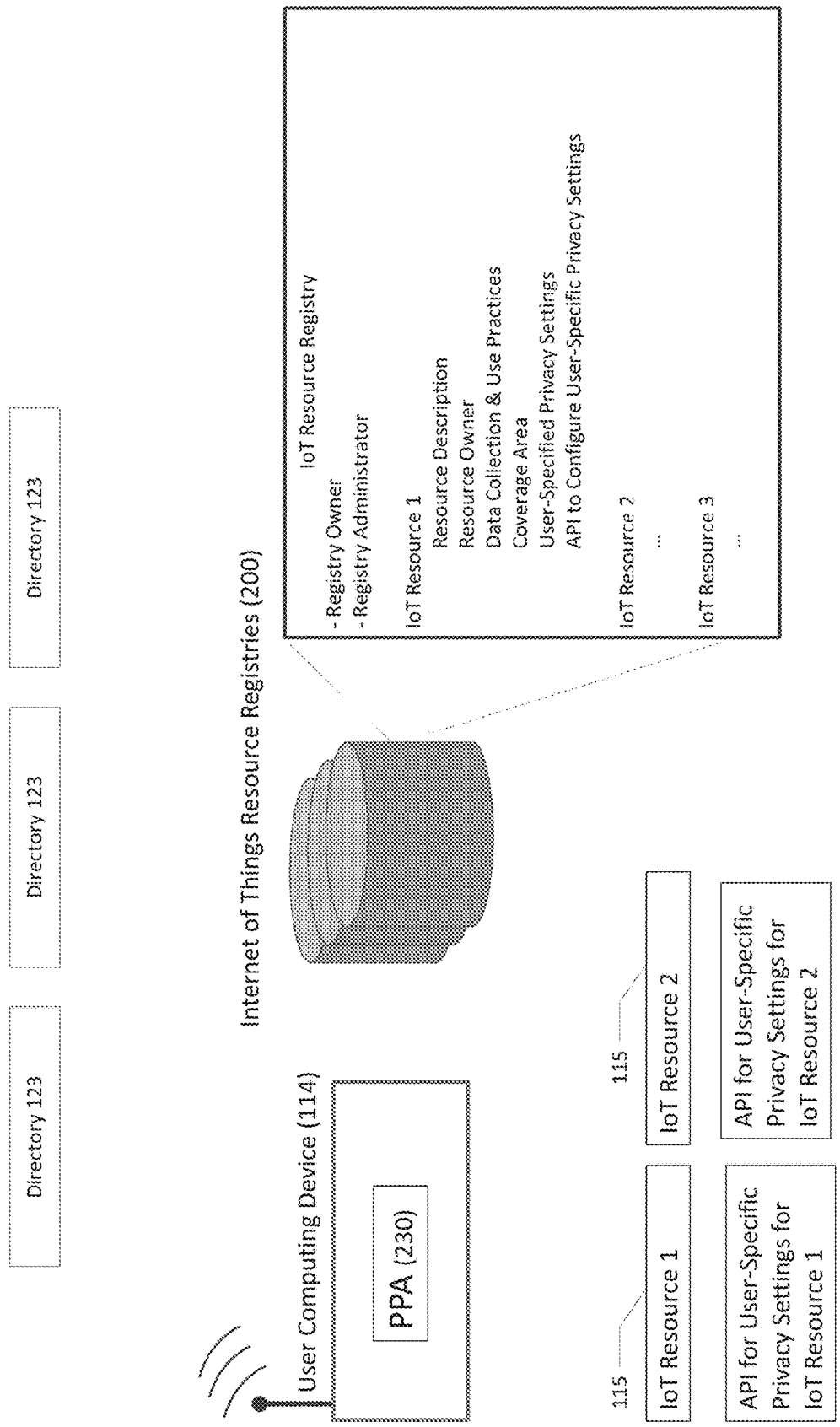

FIGS. 1A and 1B are diagrams illustrating two different ways of deploying a personalized privacy assistant to help users configure privacy settings according to various embodiments of the present invention. FIG. 1A illustrates a deployment of a Personalized Privacy Assistant 230 to configure permission settings 231 on a user computing device 114 such as a smartphone or tablet, with the permission settings controlling access to both sensitive on-device functionality 140 (e.g. GPS, camera, microphone) and sensitive on-device data 141 (e.g. contacts list, health information, IMEI number), and sensitive off-device (or external) third party data 151 and functionality 150 (e.g., social media data and functionality (such as accessing the user's Facebook account and/or posting on the user's Facebook account), third party payment data and functionality, information from third party health and fitness devices, external calendar or email services for the user). FIG. 1B illustrates a deployment of a Personalized Privacy Assistant 230 to help users configure user-specific privacy settings associated with different external IoT resources such as IoT apps, IoT devices or IoT services, according to various embodiments of the present invention.

As shown in FIGS. 1A and 1B, the Personalized Privacy Assistant (PPA) may be itself an application running on a computing device operated by the user (e.g. a desktop, a laptop, a tablet, a wearable computing device, a smart TV, a smart fridge, a smart car, a robot), or it may be running on a server (e.g. a server running in the cloud) and simply interact with the user via an application such as a browser. The PPA's functionality may also be distributed across any number of computing systems with some of its functionality running locally on a computing device in the user's possession and some of its functionality running on one or more servers.

The Personalized Privacy Assistant maintains models of user privacy preferences. In particular it maintains models of preferences that reflect people's comfort in granting different permissions to different technologies under different conditions. In one embodiment these are models of people's willingness to grant permissions controlling access to sensitive functionality or data by apps running on a user's computing device. These models are typically built and refined by collecting and analyzing privacy preferences for a population of users (or possibly a subset of people in that population, sometimes referred to herein as "test subjects"). The collection of these privacy preferences will typically (though not necessarily) require obtaining some form of consent from the "test subjects." These collective privacy preference models, which may for instance come in the form of clusters of like-minded users and profiles of typical preferences associated with people in a given cluster, can be used to quickly match individual users against them and identify a number of permission settings that are likely to be well aligned with that user's privacy preferences. When such profiles are identified for a given user, they can be used to recommend permission settings to the user and/or automatically configure some of the user's settings, possibly after checking with the user. The Personalized Privacy Assistant may also maintain models of preferences for when and how often users want to be notified about the presence of technologies collecting and/or using their data in different context (e.g. notification that a mobile app just accessed one's location, notification that one is about to enter an area under camera surveillance or a building with location tracking functionality). Again these models are typically built and refined by collecting and analyzing privacy preferences for a population of users (or possibly a subset of people in that population, sometimes referred to herein as "test subjects").

Different methods for identifying profiles (e.g., a profile associated with a cluster of like-minded users) that best match a user's preferences and for helping users configure their privacy preferences based on these profiles are disclosed herein and a person skilled in the art will easily appreciate that many variations of these methods can be used for this purpose. Other methods for maintaining and using collective privacy preference models are also disclosed that do not rely on clustering techniques. In general these models can be developed and refined through a number of different machine learning and/or statistical analysis techniques. In various embodiments privacy assistants also develop and refine individual privacy preference models, whether to replace or supplement collective privacy preference models. For instance, collective privacy preference models can be used to recommend an initial set of permission settings to users. In a later phase, information about the particular permission setting recommendations a user accepts, rejects, or modifies as well as additional permission settings a user may select, can be used to develop finer, individual privacy preference models, which in turn can be used to provide users with additional recommendations over time.

A challenge in building collective privacy preferences for users is that many users are not aware of and/or do not bother to review and configure their permission settings. Accordingly, applying machine learning techniques and/or statistical analysis techniques directly to settings collected from a population of users (or a subset of users in that population) may produce privacy models that are not reflecting people's true privacy preferences. In some embodiments, the present invention relies on post-processing techniques, where settings collected from test subjects are only kept for analysis if data collected about a subject indicates that he or she was truly engaged with their settings (e.g., the user modified a threshold number of settings, or the user at least reviewed his or her settings a threshold number of times, possibly over a given period of time).

In some embodiments, the present invention also relies on "privacy nudges" intended to motivate users to review and configure their permission settings and increase the chance that the settings are well aligned with their privacy preferences. Once users have been subjected to a sufficient number of nudges, their permission settings can be collected and analyzed to develop stronger privacy models (both collective and individual privacy models), namely models that are likely to better capture people's privacy preferences when it comes to granting or denying different permissions. Privacy nudges can come in many different forms (e.g. pop-up message informing users of one or more facts that are likely to peak their interest/surprise them, or more generally are likely to motivate them to think more carefully about the ramifications of one or more privacy decisions associated with the configuration of some of their permissions). For instance, prior research has shown that mobile app privacy nudges can lead many users to (re)visit their mobile app permission settings and often modify a number of these settings, as they realize that they are not well aligned with their privacy preferences. Examples of information shown to have meaningful impact on users include information about the frequency at which some sensitive functionality or data has been accessed, the particular apps responsible for such access, the purpose for accessing this sensitive functionality or data, including who the data might be shared with, what information might be inferred from the sensitive data and what consequences this might have (e.g. loss of one's insurance policy if sensitive health information is shared with a health insurance company, speeding ticket if someone's driving speed is shared with the police, information about one's sexual orientation or religious affiliation being shared with parties a user might not feel comfortable sharing this information with, inferring one's income or education level, and much more).

In yet some other embodiments, privacy preferences from people can be collected by asking them to review a series of scenarios and asking them to indicate their level of comfort granting different permissions or privacy settings under these scenarios. Such an approach can lend itself to crowd-sourcing privacy preference information online from a large number of subjects, possibly subject to compensation (e.g. using Amazon Turk or equivalent functionality).

Figure 2:
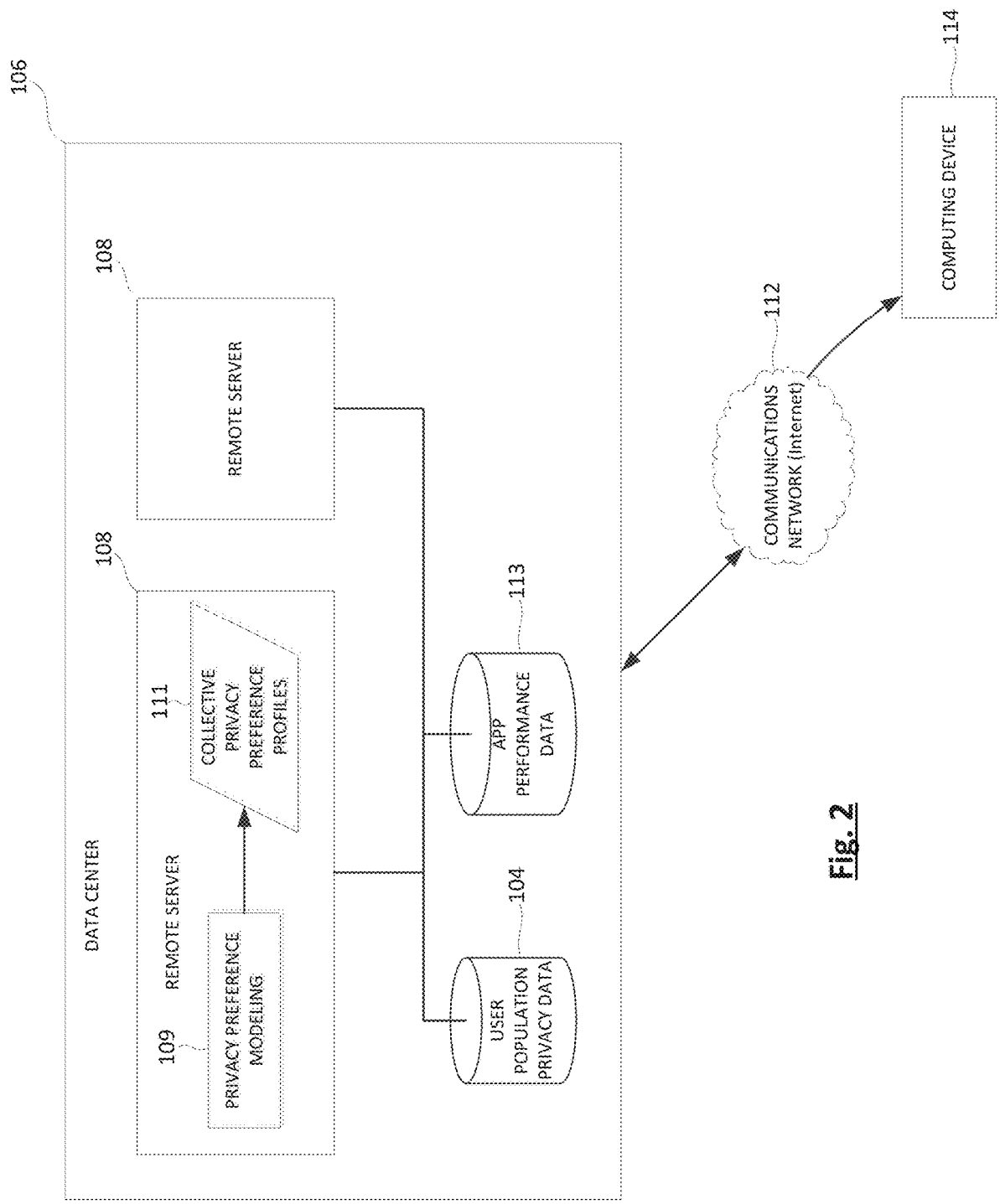
FIG. 2 is a block diagram of a system according to various embodiments of the present invention, including a user computing device that hosts the Personalized Privacy Assistant and communicates with a remote data center.

FIG. 2 is a block diagram of one embodiment of a system in which the present invention can be employed. FIG. 2 illustrates a particular configuration of a Personalized Privacy Assistant 230 and a data center 106 (having one or more data servers) with which the Personalized Privacy Assistant 230 communicates to develop and refine models of people's privacy preferences and recommend privacy settings (e.g. mobile app permission settings). As shown in FIG. 2, a data center 106 is in communication with a computing device 114 via a communications network 112 (e.g., the Internet). The computing device 114 may run or execute the personalized privacy assistant (PPA) as shown in FIG. 1, as described further below. The computing device may also run or execute one or more apps whose permissions are controlled with the aid of the PPA.

A number of configurations are possible, with processing and storage being distributed differently between the user computing device 114 and the data center 106. For instance, FIG. 1B illustrates a configuration in which the user computing device hosts the Personal Privacy Assistant (PPA) 230. In other configurations, some or possibly even all of the Personal Privacy Assistant functionality could be hosted in the data center 106. The diagram in FIG. 2 illustrates how privacy preference modeling functionality 109 can be divided between the data center 106 and the computing device 114. In this particular configuration, the data center 106 is responsible for building and refining collective privacy preference models 111 based on the collected user population privacy data 104. In other embodiments, some or all of the functionality and models depicted in FIG. 2 as being hosted in the data center could actually reside on the user computing device 114. Variations of this general system that are also covered by the present invention are described herein.

The data center 106 comprises one or more servers 108. The data center 106 also comprises a database 104 that stores data about the privacy preferences of a population of users, which can be collected as described below. From this data, in one embodiment, privacy preference modeling techniques 109 (e.g., statistical and/or machine learning techniques, as further detailed below) can derive a collection of collective privacy preference profiles 111. The collective privacy preference profiles can comprise collections of privacy preferences found to capture the way a significant majority of users in a given subset of the population of users (e.g., a cluster of like-minded users) feel about granting or denying certain permissions to different apps or categories of apps, and more generally to different technologies (e.g., to different IoT resources). These preference profiles could also capture preferences users in a subset of the population have when it comes to being notified about particular data collection or use practices in different contexts (e.g., users who want to be notified about the presence of cameras coupled with facial expression recognition technology, users who do not care to notified about the presence of such cameras unless they are at a bar, or users who want to be notified when their mobile app shares their speed with the police). More details about the user privacy preferences for apps and other technologies are described below. Also, the servers 108 of the data center 106 could be co-located at one geographic center or distributed across multiple geographic locations, still collectively constituting the data center 106. For example, one set of servers 108 could generate the models and the models could be made available to the PPAs on another, distinct set of servers 108. Each set of servers 108 would collectively comprise the data center 106.

The data center 106 can also comprise an app performance database 113 that stores data about the performance of apps, particularly the operational performance when permission settings are changed (e.g., whether the apps crash, lose some of their functionality, or impact other performance attributes, such as the battery life of the computing device 114 or the performance of other apps on the computing device). Both collective privacy preference models and app performance data can be used to make recommendations to users, as described further below. In an IoT context, app performance data may be replaced with data about the performance of different IoT resources under different possible configurations of user-configurable privacy settings.

FIG. 1A is a block diagram of the computing device 114 according to various embodiments of the present invention. The computing device 114 comprises a processor (e.g., a CPU) and memory (not shown). The memory stores the code of one or more apps (software applications) 212 that the processor can execute to provide extended functionality to the computing device. Some, and indeed probably most, of the apps 212 request permissions to on-device functionality or data 140, 141 and/or external functionality or data 150, 151. The on-device functionality 140 could be sub-systems of the computing device 114, such as, a camera, a microphone, or a location determination sub-system (e.g., a GPS device, a location tracking sub-system combining data from multiple sensors such as GPS, WiFi, accelerometer, etc.). The on-device data 141 could be information stored or otherwise determined by the computing device 114. The information could be, for example, the user's contact information, the user's calendar information, the computing device's location (as determined by a location determination sub-system), health information, a device unique ID number, and many other types of information. Examples of permissions associated with external functionality and/or data 150, 151 could include access to Facebook functionality or data, or to external payment functionality or data, or to external smart home functionality or data, or to health and fitness data whether stored on a wearable device or in the cloud, as described above.

The computing device includes an operating system and, particularly germane to some embodiments of this invention, the operating system may enforce all or some of these permission settings. When a particular app 212 requests a particular functionality or data 140, 141, 150, 151, the operating system 210 may determine, based on the device's permissions settings, whether the app should be granted access to the functionality/data or not. If access should be granted, the operating system 210 can provide access to the functionality/data. In other embodiments, decisions about granting access to sensitive functionality or data may be the responsibility of Policy Enforcement Points (PEPs) capable of enforcing user-specific permission settings configured by users and/or their Privacy Assistants via APIs that the Privacy Assistants can discover in IoT Resource Registries, with the IoT registries advertising descriptions of IoT Resources including their user-configurable (or user-specific) privacy settings, as illustrated in FIG. 1B. More details about PEPs for IoT uses can be found in A. Das, et al., "Assisting Users in a World Full of Cameras; A Privacy-aware Infrastructure for Computer Vision Applications," 2017 IEEE Conference on Computer Vision and Pattern Recognition Workshops (CVPRW), July 2017, which is incorporated herein by reference in its entirety.

As shown in FIG. 1A, the computing device 114 may run the PPA 230, which can be another app stored in the memory and executed by the processor. The PPA 230 as explained herein helps the user of the computing device 114 manage and/or otherwise configure privacy settings. This may include app permissions, privacy settings of the computing device 114 and user-configurable (user-specific) privacy settings of IoT resources 115.

Also, the computing device 114 runs at least one user interface through which the user can interact with the computing device 114. For example, the interface could comprise a display screen that shows text and graphics. The user could enter text via a keyboard, for example. The display screen could also comprise a touchscreen that recognizes touches of the display screen by the user. Alternatively or additionally, the computing device could include a speech-based interface where a speaker outputs audio and a microphone picks up the user's audible responses. This user interface functionality could be further enhanced with additional features including a haptic interface that taps the user's wrist to notify him or her about the presence of IoT resources with particular data collection or use practices, visor interface functionality, and other technologies that can be used to communicate with the user.

As shown in FIG. 1B, and as described further herein, the Personalized Privacy Assistant 230 in other embodiments can also help users configure user-specific privacy settings associated with different external IoT resources such as IoT apps, IoT devices or IoT services. Examples of IoT apps include apps that allow employees in a given building to share their locations with one another, or an app to enable someone to remotely monitor their pet at home. Examples of IoT devices include a video camera, an HVAC system, and a smart speaker (e.g., Amazon Echo™). Examples of IoT services include a building's location tracking functionality whose output can be consumed by other IoT services and/or IoT apps such as the location sharing app mentioned above; a video monitoring system whose output can be consumed by other apps such as a video analytics system with algorithms to detect petty crimes; and an analytics system to monitor the particular products a consumer in a supermarket is looking at. In this particular configuration, the IoT resources may be discovered by the Personalized Privacy Assistant 230 using discovery protocols that rely on IoT resources being advertised in IoT resource registries 200, which can themselves be discovered by the Personalized Privacy Assistant 230 based on the location of the user (e.g. discovering an IoT Resource Registry associated with a building as the user of the Personalized Privacy Assistant approaches that building). The IoT registries 200 may be queried based on the location of the user, with entries in the registries corresponding to IoT resources (e.g., IoT apps, IoT devices or IoT services) that are advertised as being deployed in different areas. Registry entries for IoT resources include other relevant attributes, such as attributes describing the IoT resource's data collection and use practices (e.g., what data is being collected, how long it is retained, whether it is aggregated or anonymized, for what purpose it is collected, which third parties it might be shared with, if any, etc.) and the user-specific settings exposed to users, if any (e.g., discovering in an IoT Registry an entry corresponding to a camera monitoring system in a building with a description of user-specific opt-in setting that authorizes the system to apply facial recognition and scene recognition functionality to the video streams it captures). The user-specific settings are advertised along with APIs that can be used by Personalized Privacy Assistants to communicate directly with these IoT resources or with policy enforcement functionality associated with these IoT resources to configure these user-specific settings (e.g., API for a user to opt into facial recognition for the camera monitoring system via his or her Personalized Privacy Assistant).

In various embodiments, the IoT Resource Registries 200 can be discovered by the Personal Privacy Assistants 230 based on the location of the user (e.g. using the location of his/her computing device 114 as a proxy for his or her location). This can be done in several possible ways. In some embodiments, different areas may be equipped with short range beacons advertising the registries (e.g., advertisements that include URIs where the registries can be accessed/queried). The user's computing device 114 can receive these advertisements wirelessly from the beacons and the PPA 230 can use the URL in the advertisement to access/query the registry 200. In some embodiments, registries may be associated with "areas of coverage" and may themselves be listed in one or more directories 123 that can be accessed by the Personal Privacy Assistants 230 (e.g., the Personal Privacy Assistants 230 may have an initial list of predefined directories 123 it knows about, or it may discover these directories 123 over time or have its list of directories 123 updated over time). In some embodiments, when querying a directory 123, the Privacy Assistant 230 can provide the user's location (e.g. location of the computing device 114 on which the Privacy Assistant 230 is running, if it is running on a mobile computing device carried by the user). Based on that location, the directory 123 can return a list of registries 200 relevant to the user's location based on the areas of coverage of the registries listed in the directory 123. The Privacy Assistant 230 can then query each of these registries 200, optionally providing the user's location again as part of the queries, and receive in return a list of IoT resources listed in these registries 200 with the list of IoT resources optionally being limited to IoT resources whose areas of coverage are in the vicinity of the user's current location (e.g., within some distance, or satisfying some other criteria indicative of whether the user is likely to have his or her data collected by these devices such as being within the range of a system of cameras). That way, the PPA 230 can control the collection and use by the IoT resources of sensitive user data and/or control access to sensitive functionality of the IoT resource (e.g., functionality provided by a camera, location sensor, microphone, biometric sensor, payment or point-of-sale system, etc.).

Figure 3:
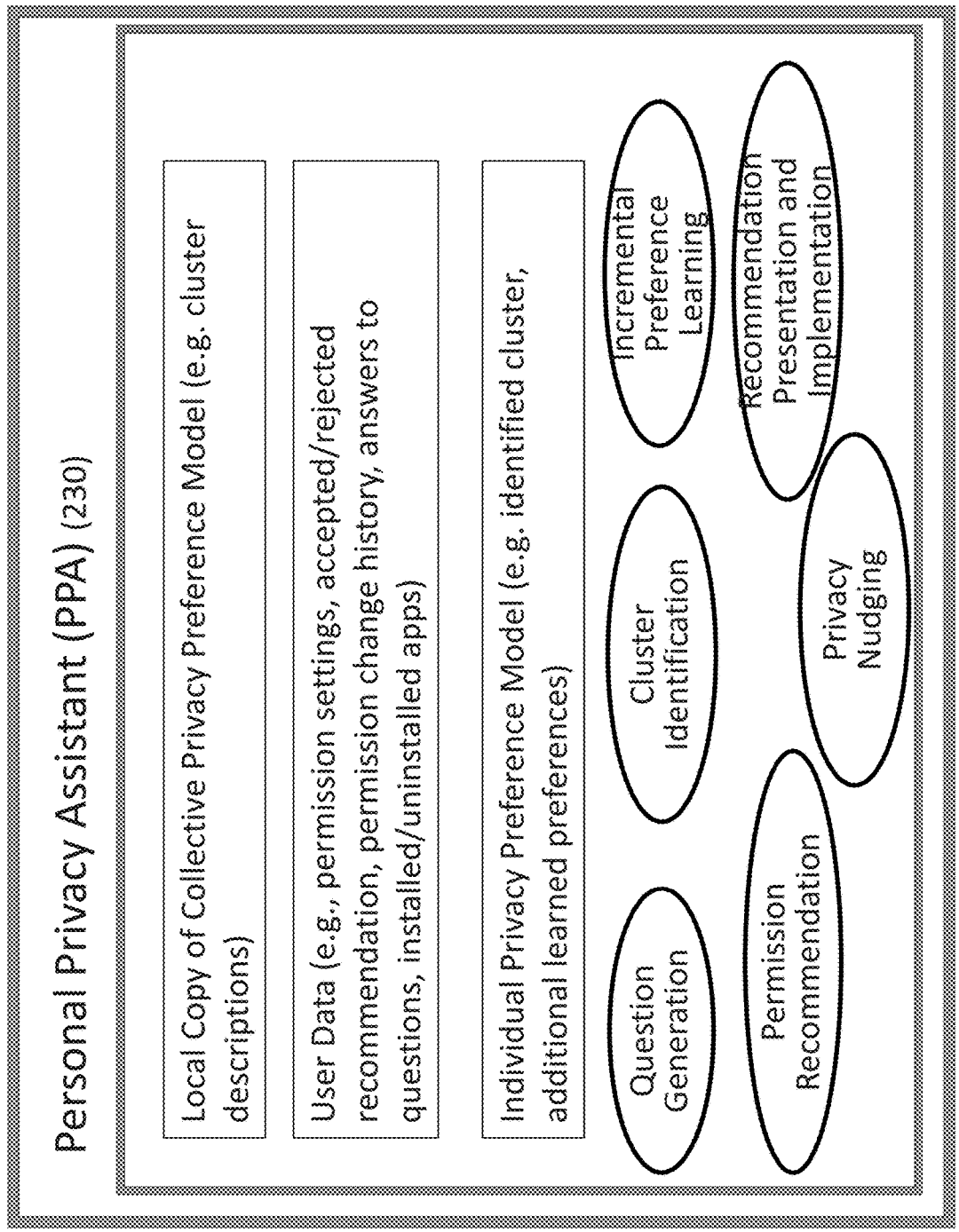
FIG. 3 shows functions of the Personalized Privacy Assistant 230 according to various embodiments.

FIG. 3 illustrates the various functions of the PPA 230 according to various embodiments. As described herein, the PPA 230 can store a local copy of the collective privacy preference model developed by the data center (see FIG. 2), and the PPA 230 can be responsible for instantiating the collective model for a particular user (the computing device's user) based on data collected about that user (e.g. apps installed on the user's phone, user answers to personalized questions, etc.). The PPA can also be responsible for further refining that user's individual privacy preference model based on additional information collected from the user such as the particular permission recommendations the user accepts, rejects or modifies as well as additional permissions the user configures over time and possibly answers to additional personalized questions asked over time to the user.

In some embodiments, the PPA can report some or all of the user collected information to the data center 106 whether (a) to receive a privacy profile corresponding to the cluster identified for the user and optionally to the specific apps installed on the user's device, (b) to just allow the data center to update its models, or to support some other activities, as determined by the particular way in which functionality is distributed between the PPA and the data center—different configurations offer different advantages in terms of local processing requirements, communication lags, responsiveness, and more. In other embodiments, as shown in FIG. 3, the PPA can store a local copy of the collective privacy preference model in order to generate an individual privacy preference model based on the user data. The PPA as described herein can also generate questions for the user to elicit their privacy preferences, provide privacy nudges to the user to sharpen models of their preferences, motivate them to review their settings, help determine the cluster that best matches the user's preferences, and determine, present, confirm and implement permission recommendations.

In various embodiments, the PPA 230 uses information about the apps 212 installed on a user's computing device 114 to elicit the user's privacy preferences, such as (in one embodiment) whether the user feels comfortable or not granting a particular permission to apps in a given category (e.g. game apps, utility apps, social networking apps). This may come in the form of questions customized to reflect the particular apps in this category that the user has installed on his or her device. These questions can be further qualified according to the particular purpose(s) for which apps in a given category may request a given permission (e.g., determining whether the user is generally comfortable granting access to his fine location gaming apps category for the purpose of the apps being able to operate, for the apps to share the resulting information with advertising networks that may in turn use this information to better target the user, or for the apps to share this information with analytics companies that collect extensive profiles about users, or determining whether the user is comfortable granting shopping apps access to camera functionality for the purpose of scanning bar codes, etc.). Based on the information collected from the user, the PPA can offer the user personalized recommendations on how to configure associated permission settings. The PPA can use interactive profile assignment dialogs for this purpose. The dialogs can be dynamically generated by the PPA based on, for example, decision trees generated to identify a cluster that best matches a given user. In one embodiment, the dialogs consist of questions asked to the user by the PPA, as it traverses the decision tree, with questions at each node in the tree taking into account information such as the particular apps the user has installed on his or her computing device and the answers he or she has provided to earlier questions. The dialogs may be used to match users to clusters and corresponding privacy profiles that best align with their preferences. The profile identified for a given user can be the basis for an individual privacy preference model for that user (in embodiments of the PPA that rely on privacy profiles), which the PPA can further refine over time based on additional interactions with the user. The determined profile can be used to provide the user recommendations on which app permissions to grant or deny and more generally how to configure different user-specific privacy settings. In other embodiments the dialogs with users may be based on other collective privacy preference models and may rely on other machine learning techniques such as content filtering techniques or some of the other statistical and machine learning techniques discussed herein. In some embodiments, the PPA gives the user the option to accept multiple recommended settings at once and possibly also the ability to modify one or more recommendations, as needed.

FIG. 12 is a flow chart of a sample process by which the preference models can be built and used in the PPA. Process 2100 involves generating the models and incudes collecting permission settings from the test subjects at step 2120 as well as possibly other relevant data (e.g. log of permission setting changes for the user) and forwarding these test subject privacy data to a test subject privacy database, typically stored on a server (see 300 in Alternative FIG. 2). In some embodiments, prior to collection of the data or in parallel with it, some or all of the test subjects can be exposed to privacy nudges at step 2110. "Privacy nudges" can be considered as communications with a test subject (e.g., through pop up messages or other ways of catching the test subject's attention) aimed at motivating the test subject to reflect on certain privacy decisions (or privacy choices) they have made or need to make, whether implicitly or explicitly (e.g. decisions associated with permission settings or other user-specific privacy settings). A privacy nudge can highlight potential risks to a user that the user may not be aware of or may have underestimated, such as the number of times the test subject shared his/her location, how that information is used, who it is shared with, what might be inferred from it and more. Privacy nudges are designed to overcome cognitive and behavioral biases such as user's tendency to heavily discount potential risks associated with the collection of their data and the different ways in which this data could potentially be used, and behavioral biases such as user's tendency to not engage with default privacy settings as doing so is often perceived as a distraction from the primary task in which the user is engaged (e.g. posting an update on a social network, responding to an email, completing a purchase online). More details about privacy nudges can be found in H. Almuhimedi et al., "Your Location has been Shared 5,398 Times! A Field Study on Mobile App Privacy Nudging," 33rd Annual ACM Conference on Human Factors in Computing Systems (CHI), pp. 787-796 (2015), which is incorporated herein by reference.

Figure 4:
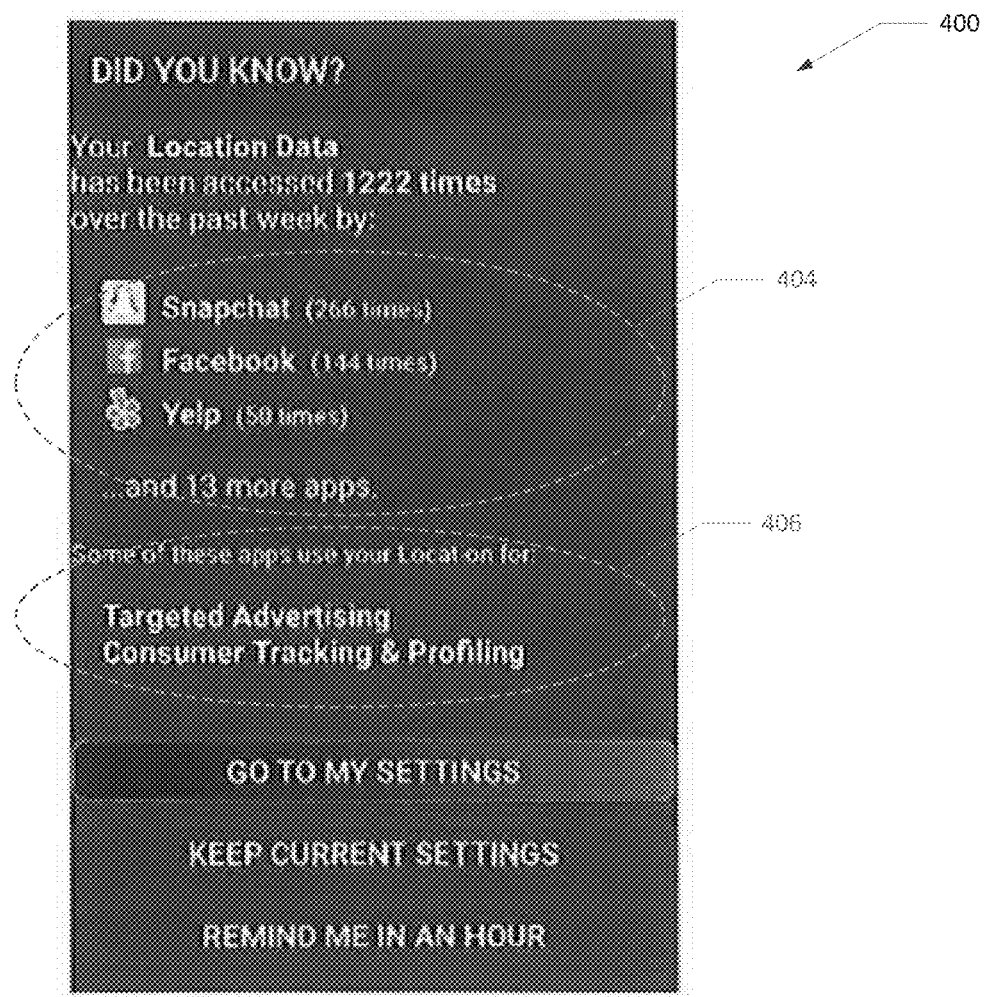
FIG. 4 is a screen shot showing an example of a privacy nudge provided by the personalized privacy assistant according to various embodiments of the present invention.

FIG. 4 shows an embodiment of a privacy nudge 400 graphically rendered on, for example, the user's computing device 114 according to various embodiments of the present invention. In the illustrated example, the privacy nudge indicates the total number of instances that an app was granted access to data or functionality controlled by a permission, namely in the illustrated example, the user's location. Moreover, an app component 404 can display the number of instances that particular apps used a permitted privacy-related permission, such as accessing location data, as in the illustrated example. In addition, in this particular instance, a purpose component 406 of the privacy nudge 400 indicates the probable purpose for which the accessed location data is used, such as targeted advertising or consumer tracking and profiling. Such purpose information might further motivate a user to review his or her settings, as it might come as a surprise or might reveal to the user data practices that he or she might not feel comfortable with. In this particular instance, purpose associated with each permission request was derived from an analysis of the app's code, looking in particular at whether requests for particular permissions originate from third party libraries or not, and inferring the likely purpose(s) for accessing the permission accordingly (e.g., permission accessed to support the app's core functionality when first party code is responsible for the request, permission accessed to share information with a social networking site when the permission request originates from a third party library associated with a social networking site, with an analytics company when it originates from a third party library associated with an analytics company, with an advertising network when it originates from a library associated with an advertising network, etc.), as detailed in J. Lin et al., "Modeling users mobile app privacy preferences: Restoring usability in a sea of permission settings," 2014 Symposium On Usable Privacy and Security (2015), which is incorporated herein by reference. In other embodiments such information can be inferred from descriptions of the apps, from information directly provided by the app's developer, from analysis of the app's behavior and the traffic it generates, or even from user reviews.

After collection of the test subjects' permission settings at step 2120, at least one, but possibly multiple, collective privacy preference models may be derived from the test subjects' permission setting data. The model(s) may be derived using machine learning or statistical analysis techniques. Examples of relevant machine learning and statistical analysis techniques that can be used to develop collective privacy preference models include: clustering techniques, collaborative filtering techniques, content-based filtering techniques, logistic regression techniques, support vector machine techniques, Bayesian inference techniques, decision tree learning techniques, and more, including ensemble methods that combine multiple models. Some elements of the preference models can also be improved using deep learning techniques. Other machine learning techniques such as unsupervised learning techniques can also contribute to further enriching collective privacy preference models.

Privacy preference models might also be produced through the manual refinement of rules.

In one embodiment, collective privacy preference models can come in the form of a number of privacy preference profiles obtained by clustering users with similar privacy preferences and identifying profiles of permission settings that users in a given cluster strongly agree on. The PPA can use these profiles to identify for each user the cluster (and profile) that best matches his/her privacy preferences. The privacy preference profiles can comprise, in one embodiment, collections of permission settings that test subjects in a given cluster strongly agree on (e.g. a threshold percentage of test subjects in the cluster concur on granting a given permission to a given category of apps for a given purpose, or concur on denying a given permission to a given category of apps, or more generally settings identified for different clusters of users using machine learning and statistical techniques such as Support Vector Machines, Random Forests, or other available machine learning and statistical techniques). A clustering technique for deriving the profiles is described in more detail herein. Different possible features can be used to identify clusters of users and associated privacy profiles, as well as build other types of privacy preference models. This includes building finer models that distinguish between individual apps (especially in the case of particularly popular apps, for which ample data from test subjects is likely to be available), building models that distinguish between finer types of purposes, building models that distinguish between different categories of third parties with which data might be shared or even individual third parties, building models that take into account additional information such as the retention policy associated with the collection of data, whether the data is aggregated or anonymized and more.

Process 2200 shows the general process in which the model is used to configure permission settings for a user, i.e., a user of computing device 114. At step 2210, information about the user is collected. Various techniques and sources for collecting the user's information are described herein, and can involve, in one embodiment, answers to fixed questions, or to dynamically generated questions personalized for the user, e.g. based on the specific apps the user has downloaded on his or her computing device. These personalized questions can be presented to the user via an interface of the computing device (e.g., a text/display interface and/or a speech-based interface).

Figure 7A:
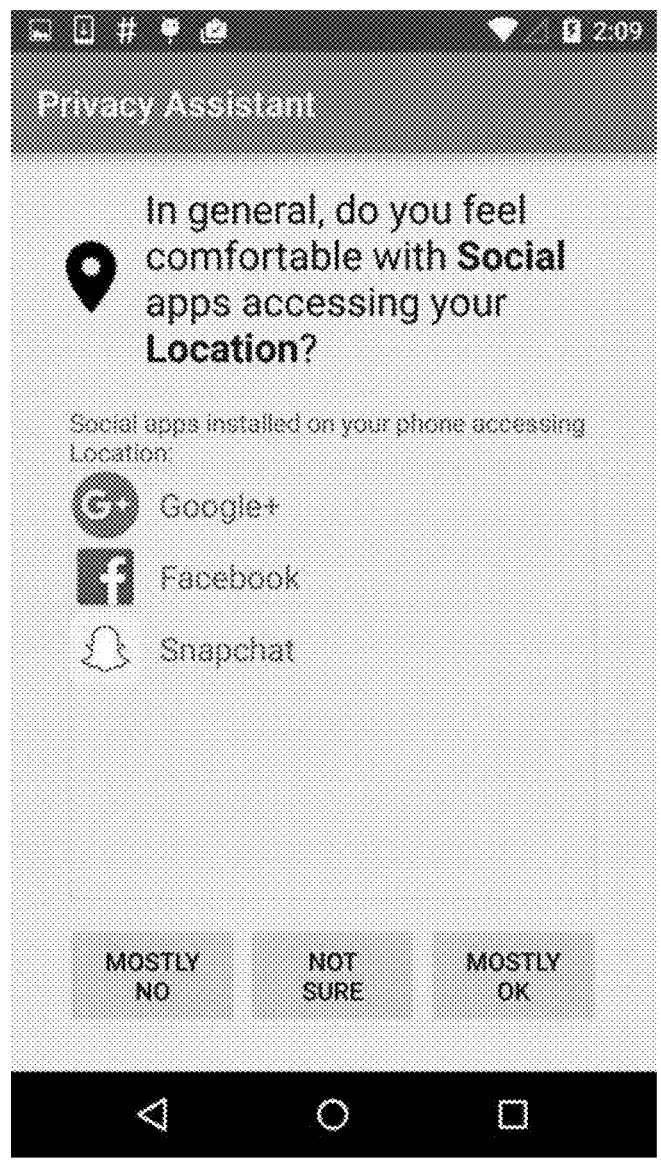
FIGS. 7A-7C are screen shots of example questions that can be provided by the personalized privacy assistant in order to collect information about the privacy preferences of the user according to various embodiments of the present invention. These figures correspond to an embodiment of the invention deployed in the form of a mobile app in the Google Play Store.
Figure 7B:
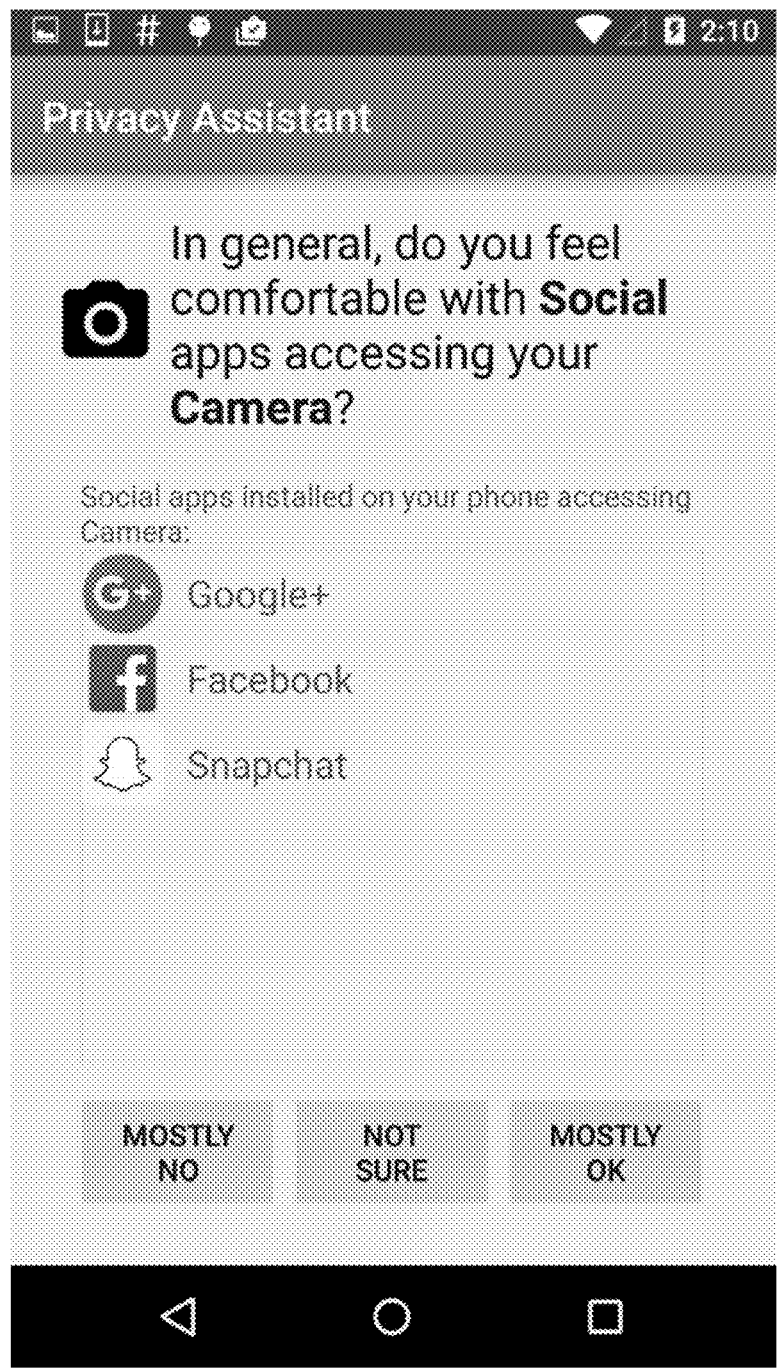
Figure 7C:
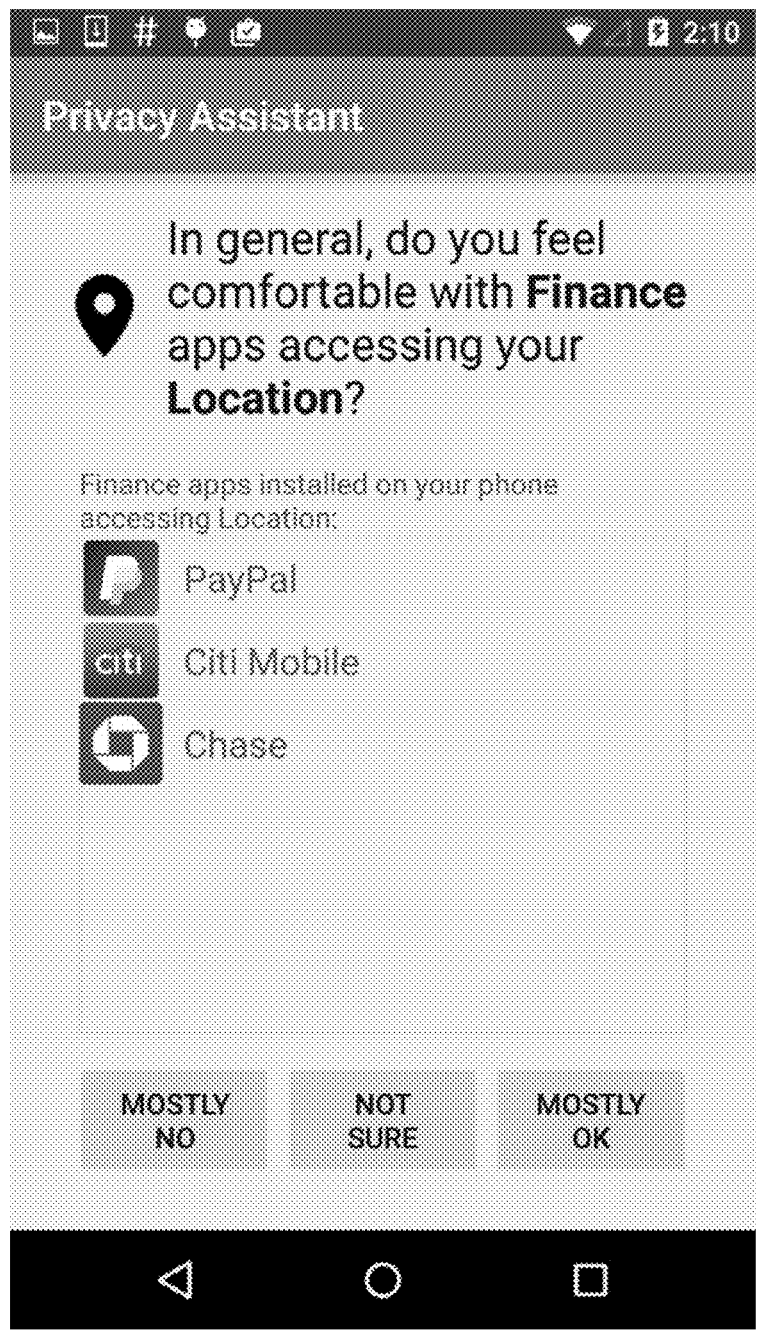

FIGS. 7A-C show examples. In these examples, the PPA 230 presents a display to the user asking the user how he/she feels about apps in a certain app category accessing a particular functionality or data 140, 141, 150, 151. In FIG. 7A the app category is social apps and the requested sensitive data is the user's location; in FIG. 7B the app category is also social apps but now the requested functionality is the user's computing device's camera; and in FIG. 7C the app category is finance apps and the requested data is location. At the bottom of each display, the user can input their response. The user's responses can be used to make the permission recommendations to the user as described herein.

In various embodiments, this information (e.g., the user's response to the question(s) or other applicable user information) is transmitted to the data center (such as from the user's computing device or other sources of such user information) so that, at step 2220, recommended permission settings for the user can be identified by the servers of the data center based on the user information collected at step 2210. In other embodiments, the parts of the collective privacy preference models required to assign a cluster to a user can be stored on the computing device itself (114) and the computation can be performed locally on the computing device, at which point the corresponding privacy profiles can be retrieved from the data center (e.g. by identifying to the data server the particular cluster determined to be relevant and the list of apps installed on the user's computing device). In yet other embodiments, the privacy profiles for each cluster can also be stored on the user computing device, in which case the entire process can be performed locally. In one embodiment, the user can be assigned a particular cluster (the cluster that most closely matches information collected about the user) and the recommended permission settings can be based on the permission settings found in the privacy profile associated with the cluster assigned to the user, such as illustrated in the examples of FIGS. 14-16, described below. In some embodiments privacy profiles may include recommendations at the level of entire categories of apps, while in other embodiments some or all recommended settings may be at the level of individual apps (e.g. particularly popular apps for which sufficient test subjects data is available and/or for which users might feel differently about granting or denying some permissions, possibly because they trust these apps more or for some other reason). In yet other embodiments, as already described herein, recommendations can be filtered based on operational data (or app performance data) about the apps, such data indicating whether denying particular permissions to particular apps seem to be impacting performance (of the app itself, of the device or possibly of other apps). In some embodiments this operational data may also be stored on the computing device 114. In other embodiments it might be stored in the data center 106 with only data relevant to those apps installed on the computing devised being retrieved by the computing device from the data center to determine which specific permission setting to recommend to the user.

Specifically, the PPA can look at each app installed on the user's device, identify the category corresponding to this app (in the case of a privacy preference profile where recommended settings are organized by app categories—other models are possible), and identify in the profile recommended settings for the permissions requested by this app, if there are any. At step 2230, the recommended permission settings are presented to the user of the computing device and at step 2240 the permission settings can be configured based on feedback from the user, such as the user accepting, rejecting or modifying the recommended permission settings.

Figure 8A:
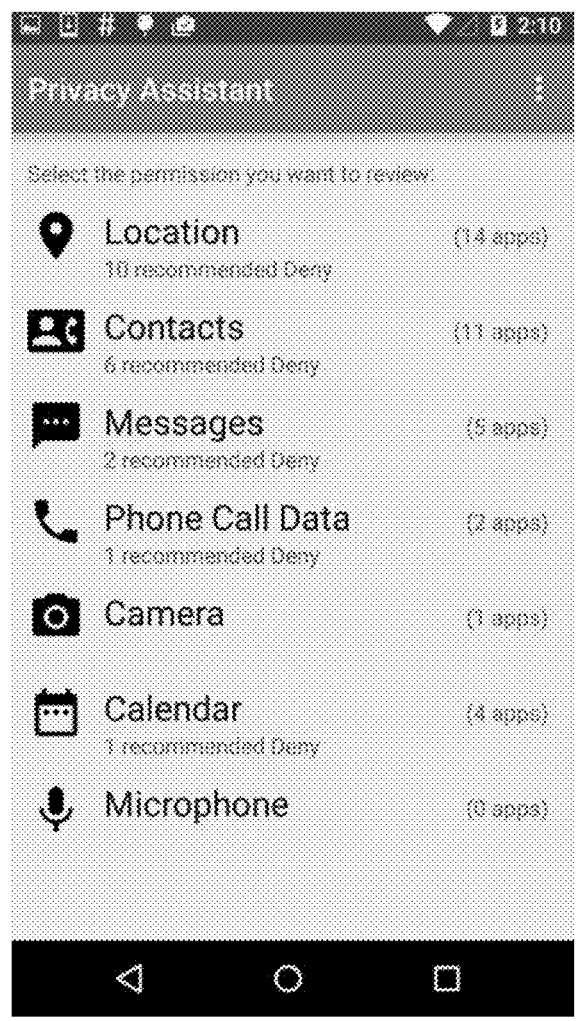
Figure 8B:
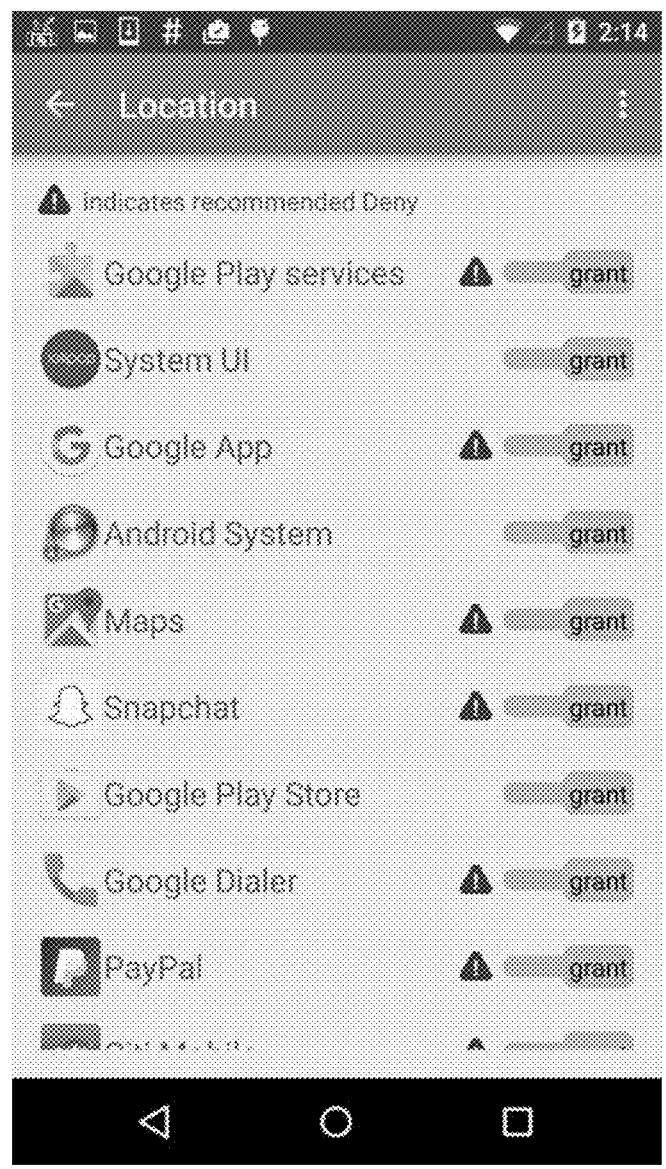
Figure 8C:
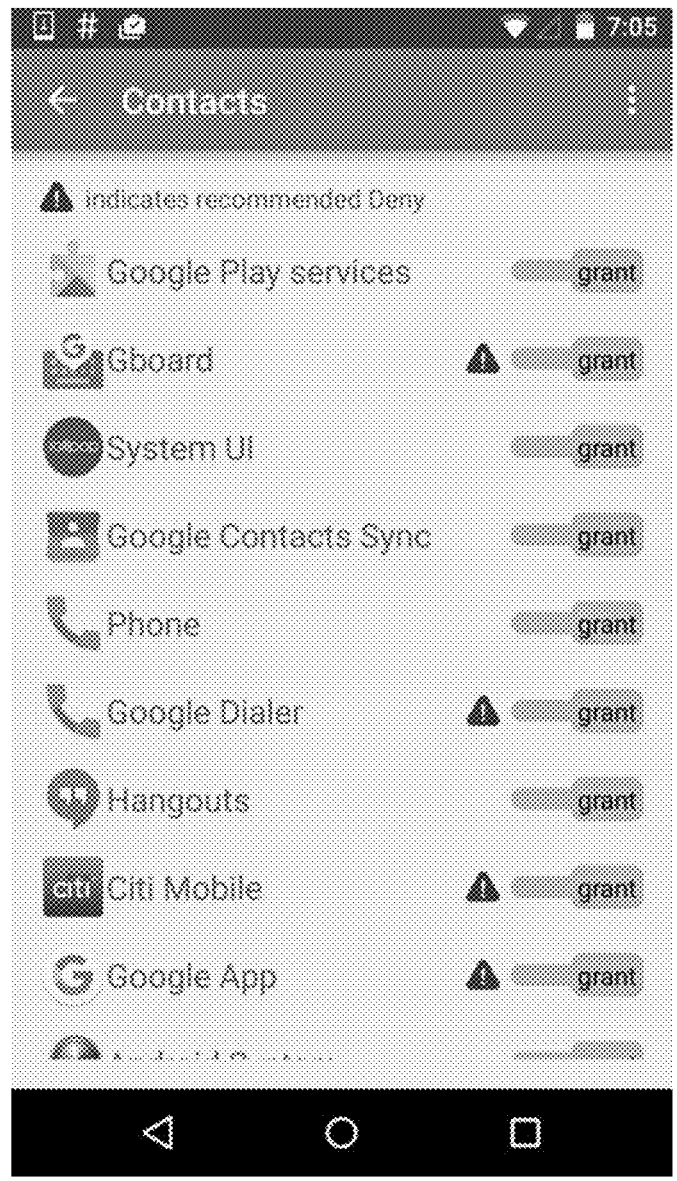

FIG. 8A-C show illustrative displays according to embodiments of the present invention of how the user could provide feedback. First, as shown in FIG. 8A, the user could be presented with a screen where permissions are organized by types of permissions (e.g., location, contacts, messages, etc.) with an identification of the number of apps that request each type of permission. The user could then select one type of permission, which then causes the display to list the apps that request that type of permission, along with any recommendation by the PPA to possibly deny some of these permissions, if they are not yet denied. The reader will appreciate that a number of ways of presenting recommended permission settings are possible. In this particular embodiment, the user can then go through the recommended setting changes (e.g., recommendation to change the location permission requested by the PayPal app from "grant" to "deny" in FIG. 8B, or to change the (access) contacts permission from "grant" to "deny" for the CitiMobile app in FIG. 8C). In this particular embodiment, the user can accept or ignore each recommended setting change. In doing so, the user provides feedback to the PPA. This feedback can in turn be used to refine the user's Individual Privacy Preference model (step 2310 in FIG. 12). In this particular embodiment, the user can review each permission for each individual app as shown in the examples of FIGS. 8B (app requesting location) and 8C (apps requesting contacts), decide whether to accept or ignore different recommended settings, modify settings for which the PPA does not provide any recommendations, or modify earlier setting changes, including changes that may have been prompted by the PPA's recommendations.

Figure 5:
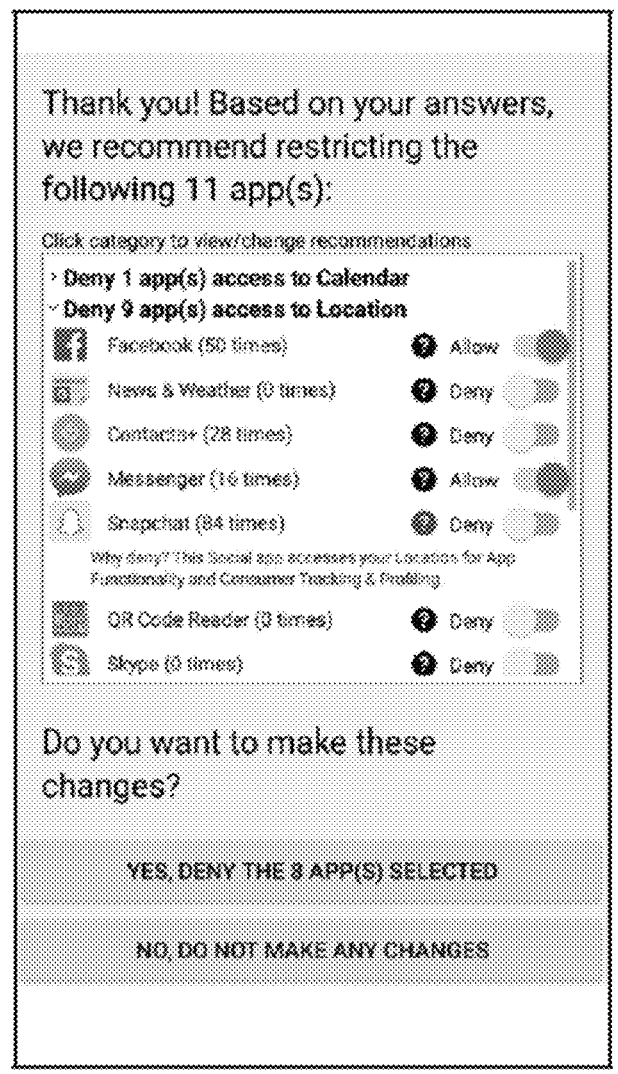
FIGS. 5, 8A-8C and 9 are screen shots of example interfaces through which the user can accept or deny the recommended permission settings according to various embodiments of the present invention.

In some embodiments, the recommendations display provided by the interface to the user may also provide the user with the option of requesting an explanation of the recommendation. One such embodiment is shown in FIG. 5. In the illustrated embodiment, several recommendations are made by the system. Each recommendation has an input means, such as a slide switch, that allows the user to allow or deny a given permission to an app. There is also, in the illustrated exemplary embodiment, a question mark ("?") for each recommendation. Of course, in other embodiments, other icons or symbols could be used to provide a means for the user to request an explanation for the corresponding recommendation. In the illustrated embodiment, the user can click the question mark, and in response the PPA can display an explanation of why a particular setting is recommended. In the example of FIG. 5, the user clicked the question mark for the Snapchat location recommendation and the PPA displayed why the PPA recommended denying that permission. That way, the user can make more informed decisions with regard to the recommendations. Such explanations can be generated in several possible ways. One approach is to identify the conditions that triggered a given recommendation. For instance, in the embodiment displayed in FIG. 5, the user has been matched with a cluster in which the majority of users do not feel comfortable disclosing their location to social apps when their location information is potentially used for "consumer tracking and profiling". Accordingly, the explanation shown to the user identifies these conditions as the conditions that triggered the corresponding recommendation. Other possible approaches for generating recommendations include taking into account information gain considerations that can be used to identify those factors most likely to have contributed to a given recommendation. The number of such factors can be limited by a threshold to ensure that the recommendations are easy to understand. The threshold could possibly be adjusted (e.g. increased) in response to additional requests from the user or some other type of interaction with the user indicating that he or she would like additional details. In other embodiments, the PPA might generate explanations that refer back directly to information collected from the user such as answers provided earlier by the user to some questions (e.g. "You told us you didn't feel comfortable sharing you location with Facebook and Google+. In general, people who don't feel comfortable sharing their location with Facebook and Google+, also do not feel comfortable sharing it with Snapchat"). In yet some other embodiments, explanations could also include an opportunity for the user to indicate that he or she feels differently about a particular recommendation (e.g., "If you don't feel the same way about Snapchat, click here"). This could in turn be used to trigger a dialog intended to further clarify the user's privacy preferences and better discriminate between situations when he or she feels comfortable granting a permission and those when he or she feels uncomfortable doing so.

Figure 9:
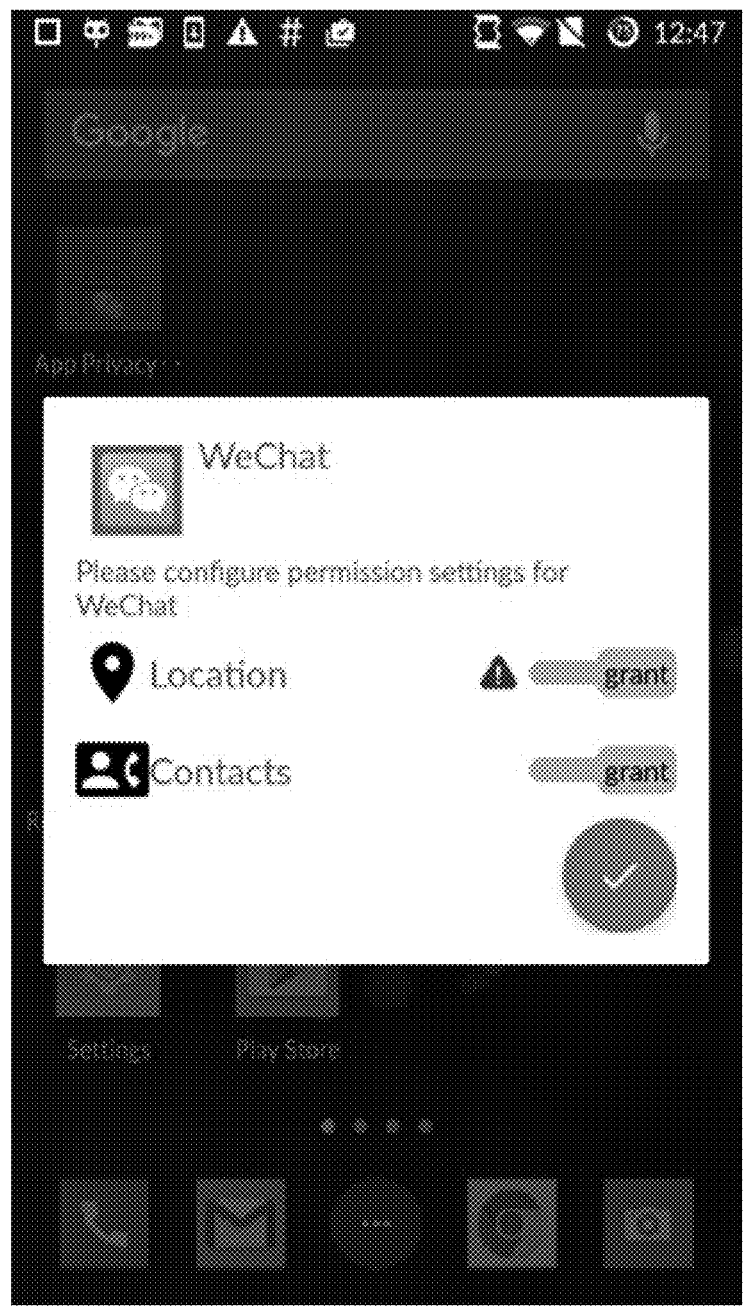

In some embodiments, recommended settings can be presented in bulk with the user having the ability to review them and decide individually which recommendation to accept, reject, or modify, as shown in the example of FIGS. 8A-C. In other embodiments, the recommendations can be presented more incrementally to the user, such as when a user launches a particular app on his computing device, or when the user has just completed the installation of a new app, as shown in the example of FIG. 9. In yet other embodiments, recommendations might be bundled, with the user only having the option to accept or reject multiple recommendations at a time. In yet other embodiments, users may also have the option of modifying recommendations (e.g., when permissions are non-binary such as a permission where a user can choose to modulate the level of granularity at which a permission is granted such as access to location at different levels of granularity).

In yet other embodiments, additional personalized questions can be generated when the user accepts, rejects or modifies a recommended setting. FIG. 10 illustrates such a situation, namely User 1 denies Permission 3 to App 21, despite the fact that User 1 belongs to cluster 1 and that the privacy profile for cluster 1 recommends granting permission 3 to apps in App Category2. At this point, in some embodiments, the PPA can generate a personalized question to see whether this rejection of a recommendation can be used to infer a more general privacy preference for User 1, namely by asking something like, "In general, do you feel uncomfortable granting Permission 3 to apps in App Category 2", or, as is assumed in FIG. 10, "In general, do you feel uncomfortable granting Permission 3 to any app?" In the particular instance illustrated in FIG. 10, User 1 answers "yes" to the latter question. This in turn results in the system updating the individual privacy preference model for User 1 and noting that, in contrast to the general profile for users in Cluster 1 (part of the collective privacy preference model), User 1 wants to systematically deny Permission 3 to all apps, as denoted by the two asterisks next to "Deny" for the entry for Permission 3 in the rows corresponding to App Category 2 and 3.

Dialogs of this nature can be initiated by the Privacy Assistant under a number of possible situations. This includes the time when a user installs another app or is about to first come into contact with a new IoT Resource that has just been discovered by his privacy assistant. This also includes situations where the privacy assistant sends a nudge to the user (e.g. to motivate the user to revisit prior privacy decisions and see whether his or her preferences have not possibly changed). This can include situations where a user modifies a permission setting he or she had selected earlier. The question(s) in this case can focus on understanding the change and trying to elicit the scope associated with this change (e.g. is it specific to the context in which the user is, is it specific to the app or IoT resource with which the user is interacting, does it have to do with the category of app or IoT resource, the purpose for which the permission is requested, the retention period associated with the data being collected, the nature of the permission, or the potential uses of the information being collected). Different possible scopes can lead to different questions, with these questions potentially being scripted or being driven by data collected from users and privacy preference models that can help identify those questions that are likely to be most discriminative (e.g., maximizing information gain to minimize the number of questions that the user has to answer, for instance by learning decision trees associated with different situations such as changes of different types of permissions or different patterns of change in permissions associated with different situations).

Asking the user a follow up question, such as a question based on his feedback on recommended permission settings, as outlined above, corresponds to step 2310 in the process outlined in FIG. 12. It can take place after permissions have been configured or possibly as part of a dialog with the user that can take place while permission settings are recommended to the user (namely as part of step 2230). The present invention envisions any number of ways of interleaving these interactions with the user.

Once the permission settings are configured, whether automatically or after checking with the user, as outlined above, they start to be enforced of the computing device's operating system.

Process 2300 shows a general process for further refining a user's Individual Privacy Preference model. At step 2310, additional information about the user can be collected. It can take the form of a question that directly builds on the feedback of the user on permission settings recommended to him/her, as illustrated above. It can also be triggered by the user downloading a new app on his computing device and manually configuring one or more permissions requested by this app. It could also be triggered by a number of other events such as the user deciding to manually review some of his or her permission settings, thereby opening the door to another dialog with the PPA and an opportunity to learn more about the user's privacy preferences. This information will typically be stored locally by the PPA and may be fed into the PPA's local machine learning functionality to derive additional preferences for the user and/or generate additional personalized questions for the user and further elicit information about his or her preferences. This information can also be forwarded to the data center for incorporation in the collective privacy preference models. Step 2320 represents a step where the additional information collected from the user is used to refine the user's individual privacy preference model. As the user's individual privacy preference model is refined, additional recommendations (step 2330) may be identified and presented to the user, whether in bulk or in a more incremental manner (e.g. as the user launches or downloads apps). In some situations, they may simply be automatically implemented (e.g. if confidence in the recommendation is sufficiently high).

In some embodiments, permission recommendations are filtered based on app performance data, as illustrated in step 2225 in FIG. 13. An example of app performance data is shown in FIG. 11. App performance data will typically be collected by a data center/server 300 (see FIG. 2) and can include data such as whether the app works when a given permission is denied or whether it crashes or loses some of its functionality. This information may be directly collected from the devices of test subjects, or it may be obtained by systematically testing each app while selectively denying each of its requested permissions. This information could also be obtained from or supplemented with static code analysis techniques that predict what happens when a permission is not granted. In some embodiments, some of this data could be provided directly by app developers. Another valuable source of app performance data can be obtained by mining reviews of apps by users, focusing on comments that pertain to users who tried to deny some permissions. As users download new apps on their computing device, their PPA can fetch performance data that pertain to these apps and store it locally to help filter recommended permission settings it generates. As discussed earlier, different embodiments might store data in different places (e.g. whether on the user device or in a data center).

User privacy preference models may be limited to the granting or denying of permissions to different apps. FIG. 14 illustrates an example for two different clusters—Cluster 1 and Cluster 2. The two tables in FIG. 14 show recommendations for people in each cluster, namely preferences common to a significant majority of test subjects assigned to that cluster. Permissions 1, 2 and 3 could be different types of permissions that apps frequently request. In the illustrated example, for apps in a first category (App Category 1), users in Cluster 1 have a sufficiently strong tendency (e.g., above a threshold confidence level, or as determined via some machine learning technique) to grant Permission 1 and deny Permission 3, but there is no strong agreement (or recommendation) for Permission 2. On the other hand, users in Cluster 2 collectively show sufficiently strong agreement on denying Permissions 1, 2 and 3. Thus, if a new user was determined to match most closely with users in Cluster 2, the permissions recommendations for the new user would be to deny Permissions 1, 2 and 3 for apps in App Category 1, and so on as illustrated in FIG. 14. In some models, users could be assigned to multiple clusters. In other models (e.g. collaborative filtering models or other models discussed elsewhere in this invention), recommendations on whether to grant or deny different permissions to different apps or different app categories under different conditions (e.g. different purposes) may be computed directly without having to assign users to clusters. Recommendations may include recommendations to deny or grant a permission to a particular app, or a category of apps; they may include recommendations to prompt the user to configure a setting; they may include differentiating between purposes associated with a permission or privacy preference setting, or other relevant data collection and/or use attribute associated with a given user specific privacy setting. They may also include recommendations to modify the granularity or resolution at which some data or functionality can be accessed. More generally, privacy preference models are not limited to recommending privacy settings and but may also include the learning of models of when to notify users about different types of data collection and use practices, as discussed elsewhere in the present invention.

In the example of FIG. 14, the recommendations were based on the app category and the permission requested. In other embodiment, the models might differentiate between the different possible purposes for which an app might request a given permission, as described in connection with FIG. 15. For example, a user might be more likely to grant a permission for an app where the requested functionality/data is needed for the core operation of the app, and less likely to grant the permission where the requested functionality/data is not needed for the core operation (e.g., advertising). FIG. 15 is a table showing how, for one cluster of users, the recommendations can change based on the purpose of the requested permission. In the illustrated example, it is assumed that there are three possible purposes for each of two permissions (not every app in a given category has to necessarily request each permission or request a permission for each possible purpose—this will typically vary from one app to another). As shown in this example, people in the cluster tend to grant Permission 1 for Purpose 1 for apps in App Category 1, but there is no consensus (and no recommendation) for Purposes 2 and 3 of Permission 1 for App Category 1, and so on as shown in the example of FIG. 15. Thus, the permission recommendations to a new user that was classified to this cluster would be to grant Permission 1 for App Category 1 for Purpose 1, and deny Permission 1 for App Categories 2 and 3 for Purpose 1, and so on as shown in the example of FIG. 15.

The models may further distinguish between different contexts or the values of different contextual attributes, with some users feeling comfortable granting some permissions under some contexts but not under others. For instance, a user might feel comfortable granting access to his or her location when he or she is at the office or in a public place, but not when he or she is at home or at a bar. In this example location is a contextual attribute whose value determines when the user feels comfortable granting a permission. Research shows that many users have such context-sensitive privacy preferences. In the absence of a PPA and of permission settings that capture contextual attributes such as these, a user would have to manually toggle corresponding permission settings as his or her context changes. In some embodiments, a PPA can take care of automatically modifying the user's settings, based on his or her preferences and the value of relevant contextual attributes. An illustrative example of such context-sensitive permission settings for a cluster is shown in FIG. 16. The example shown in FIG. 16 includes some permission recommendations that were not used in the examples of FIGS. 14 and 15. For example, one illustrated recommendation is "grant low fidelity access" (e.g., for Permission 1, Context 3 for App Category 1). When a permission request for functionality/data has this setting, the full capabilities of a sub-system of the computing device or the highest resolution information of the computing device is not provided. Instead, some diminished capability is provided, such as location only to within a certain distance (e.g., 1 mile) or lower resolution camera images or sound captured by the computing device's microphone, etc. Another different setting is "Falsify" (Permission 1, Context 2 for App Category 3). When a permission request has this setting, the app is granted false or spoofed information, such as false location information, false contact information, etc. Other permissions are "grant restricted access," such that, for example, the app's possible use of the functionality/data granted by the permission is restricted.

A field study conducted by the inventors is described in the incorporated provisional application.

For the purpose of accurately capturing users' privacy preferences from their privacy settings, in one embodiment the inventors assume that users (or test subjects) are comfortable with a restrictive permission setting they chose, if they have subsequently been observed keeping the restrictive setting (i.e. not changing it back to a permissive setting) over a sufficiently long period of time. To increase users' (or test subjects') awareness and engagement, and to motivate them to review their permission settings, in one embodiment, the inventors developed a PPA by making a number of modifications and enhancements to the Android permission manager App Ops, as described below. It should be clear that similar functionality could be added to any number of permission managers and/or included in other forms of PPA (e.g. a PPA to help users configure user-specific privacy settings associated with IoT Resources).

As mentioned herein, in one embodiment privacy preference modeling may use hierarchical clustering (or other clustering techniques) to group like-minded users and generate associated privacy profiles. In various embodiments, the clustering can use features that include (1) the likely purpose of the permission request as determined based on available datasets that collect such information (e.g., as described by the app developer, as identified using static and/or dynamic analysis of the app's code, as obtained by mining user reviews of the app, or using any other relevant source of information available to infer the purpose associated with a given permission request) and (2) the category of the requesting app from the Google Play store or any other suitable app store (e.g., game, social, finance, news, etc.) or any other meaningful way of organizing apps into categories, (3) the context in which a particular permission is being requested (e.g. whether permissions are restricted to times when the app is actively used by the user or whether they also include background processing, other relevant contextual attributes that might restrict conditions when a permission is being used or requested such as where the user is, what the user is doing, time of day, etc.), (4) other relevant attributes characterizing the collection and/or use of the data or functionality controlled by a given permission (e.g. retention period associated with the data being collected, level of granularity or aggregation at which functionality or data is being accessed, who the data might be shared with, etc.). App categories, rather than individual apps, can be used as features to reduce overfitting caused by less popular apps and limited training samples. Some models may also combine app categories with individual apps (e.g. popular apps may yield sufficient data from test subjects to warrant being treated separately, and/or may elicit different privacy preferences from users compared to similar yet less popular apps in the same category). User privacy profiles can be built based on training data collected from test subjects (or more generally from users), by applying, in one embodiment, clustering techniques on the feature vectors capturing data collected from test subjects or users (e.g. which permissions they are willing to grant to different apps or categories of apps and other relevant features such as those identified above). More details about hierarchical clustering and some of the other clustering and machine learning techniques that can be used to derive privacy preference profiles as applied according to some embodiments of the present invention can be found in the scikit-learn User Guide, release 0.19.1, Nov. 21, 2017, available at scikit-learn.org/stable/_downloads/scikit-learn-docs.pdf, which is incorporated herein by reference. In other embodiments, other machine learning and statistical analysis methods can be used to create the model and derive privacy profiles (e.g. deep learning techniques), as discussed elsewhere in the present invention.

In one embodiment, the inventors quantified each user's preferences as a three-dimensional tensor of aggregated preferences of (app category, permission, purpose). For each cell, the value was defined as the tendency of the user to allow or deny permissions requested by apps from a specific category for a corresponding purpose: from −1 (minus one) (100% deny) to 1 (plus one) (100% allow), and N/A if the user's settings data was not available for a cell. To estimate similarities among participants' feature tensors, missing values were imputed in the tensors. In one embodiment, in order to impute without biasing any dimension, weighted PARAFAC Tensor factorization was applied. A weight of 1 was put on all known data cells and 0 weight on unknown data cells in the tensor. Thus, the overall error of the imputed tensor in Frobenius norm was optimized using only the values known from the data. Using the users' feature vectors reshaped from the imputed tensor, the user profiles were built by applying hierarchical clustering on the feature vectors. Hierarchical clustering provides an advantage that it is not sensitive to the size or density of clusters and allows non-Euclidean distances. The inventors envision many other variations of this embodiment, including variations that include tensor entries for individual apps rather than entire app categories or even mixed tensors with some entries corresponding to collections of apps in a given category and some entries corresponding to individual apps (e.g. particularly popular apps for which data is available from a large enough collection of users). Some embodiments may fill unknown data cells according to a number of other possible schemes. Some embodiments may rely on other distance metrics and other connectivity-based clustering techniques. Other embodiments may rely on other clustering techniques (e.g., other connectivity-based clustering techniques, centroid-based clustering techniques such as k-means clustering techniques, distribution-based clustering techniques such as Gaussian mixture model techniques, density-based clustering techniques such as DBSCAN or OPTICS, canopy pre-clustering techniques, neural network techniques and more) or other combinations of clustering techniques. And, as already discussed earlier, recommendations may also be derived using other machine learning and statistical analysis techniques that do not rely on clustering.

In one possible embodiment, in order to assign new users to the generated privacy profiles, the PPA can ask the users a small number of questions about their privacy preferences. Some or all of these questions can be tailored to the particular apps installed by the user on his or her computing device and relevant features associated with these apps (e.g., as captured in the collective privacy preference model). They can also be tailored based on other information available about the user such as information identified as relevant to identifying clusters that best match users (e.g. features in the privacy model), information that can help personalize questions to reflect relevant attributes of the user and can help make these questions more relevant to the user (e.g. demographic information, home address, where the user works, information about the user's friends, etc.), as well as information related to the behavior of the apps installed by the user on his or her computing device (e.g. how often different apps have requested access to some permissions, for what purpose, etc.). This information can also be used to eliminate questions that are not relevant to a user. For instance, a generic decision tree to assign users to clusters might include a question about whether users are comfortable sharing their contacts lists with social apps for advertising purpose. If a given user does not have any social apps on his or her smartphone, the PPA could decide to build a decision tree for that user that does not include questions about social apps. In one embodiment, the inventors have used a C4.5 decision tree (more details about decision trees used according to embodiments of the present invention can be found in J. R. Quinlan. *C4.5: programs for machine learning*. Elsevier, 2014, which is incorporated herein by reference) on the set of questions applicable to a particular user (e.g. based on the apps a given user actually has on his or her computing device, the permissions requested by these apps and the purposes for which these permissions are being requested), and generate an ordered list of questions. Other decision tree algorithms could readily be used to generate these questions (e.g. ID3, C5, etc.), as well as other statistical classification algorithms. In one embodiment, users are asked a maximum of five questions to be assigned to a profile so as to limit the time investment of the user. The set of questions can be dynamically personalized for each user, so that the questions can be contextualized using the apps each user has installed on their computing devices (e.g., smartphones). They can also be dynamically contextualized to reflect other relevant attributes of a user's context such as where the user is, whether the app is actively being used versus running in the background, etc. (e.g., "In general, when at home, do you feel comfortable disclosing your location to utility apps," or "When you declined access to location to the Groupon app, was it because it was running in the background or because you generally don't want to share your location with Groupon?").

Figure 6:
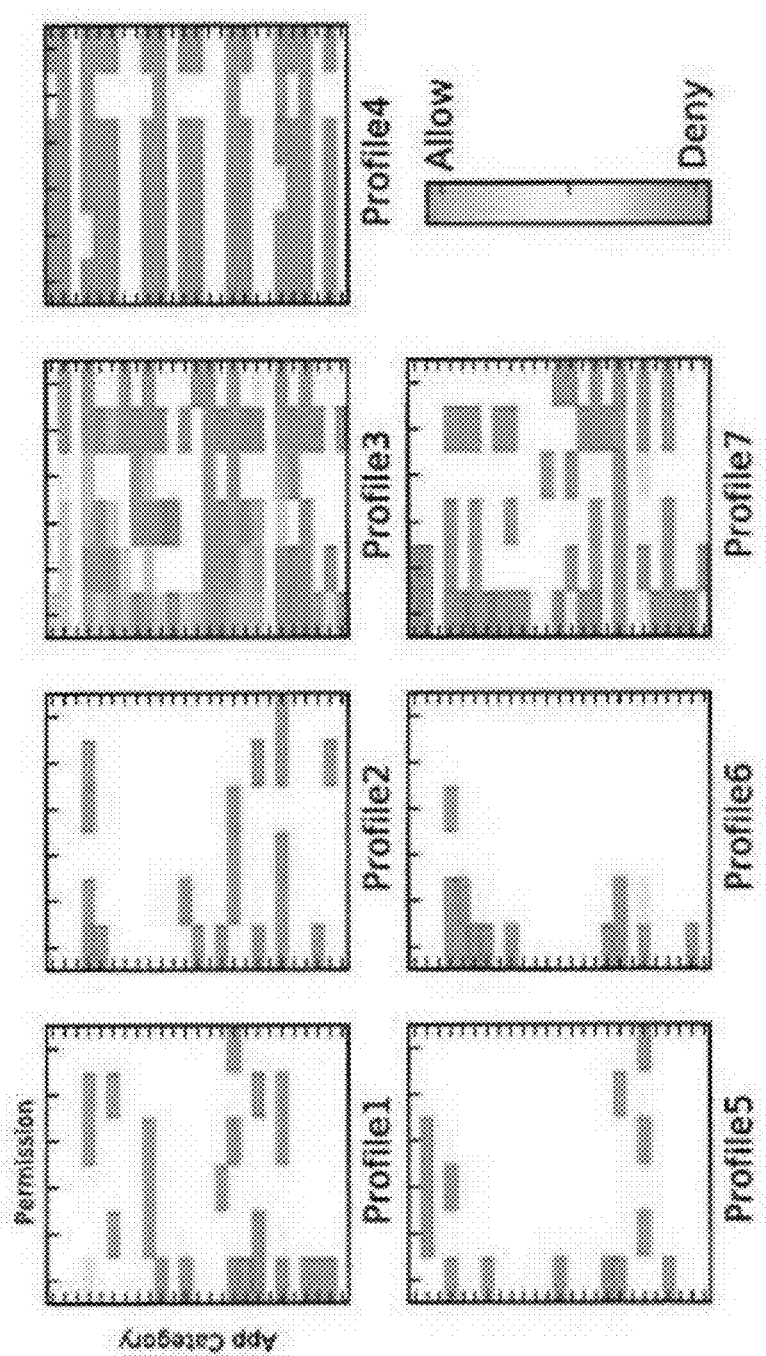
FIG. 6 is a collection of grids that show the variations between sample privacy preference profiles associated to different clusters of users, according to various embodiments of the present invention, with users in different profiles feeling more or less comfortable granting permissions to apps in different categories.

Collective Privacy Preference Profiles for different Clusters of Users (e.g., FIG. 10) can be derived by looking at the settings collected from users (or test subjects) for different permissions and different app categories (e.g. as illustrated in FIG. 6). More generally, this data may also be organized to differentiate between different types of purposes or any number of other relevant attributes as already discussed earlier in this invention (e.g. contextual attributes, data retention attributes, etc.) when such attributes are identified as influencing people's preferences or when permission settings can be configured differently for different values of these attributes. Collective privacy preference profiles can also be built for other user-configurable privacy settings as well as for privacy notification preferences, as also discussed earlier already. Recommended settings associated with these privacy preference profiles can be derived in several possible ways. In some embodiments, recommended settings for users in a given cluster will be identified when a sufficiently large fraction of users (or test subjects) in a given cluster are determined to have a preference for the same setting (e.g. a fraction of users above a given threshold such as 75% of users in the cluster have indicated they want to deny apps in a given category access to a given permission for a given purpose). In such embodiments, settings for which there is insufficient agreement among users (or test subjects) in the given cluster may simply not have any recommendation associated with them. In other embodiments, multiple thresholds might be used, including a threshold above which a recommendation will be automatically enacted (e.g. say a threshold of 90% and a sufficiently large number of data points from users or test subjects), and one where the recommendation will be used to prompt the user and see whether he or she agrees with the recommended setting (e.g. say a threshold of 70%). In other embodiments, recommendations may be derived using a number of available machine learning techniques. For instance, in one embodiment a support vector machine (SVM) classifier (more details about techniques relevant to different possible embodiments of the present invention can be found in R.-E. Fan, K.-W. Chang, C.-J. Hsieh, X.-R. Wang, and C.-J. Lin, "Liblinear: A library for large linear classification," *The Journal of Machine Learning Research*, 9:1871-1874, 2008, which is incorporated herein by reference) can be trained using the permission settings (or privacy-configurable settings or privacy notification settings) that were collected from users (or test subjects) in a given cluster. Other embodiments may rely on non-linear machine learning models as well. Based on the resulting privacy profiles and, more generally, based on these recommendation models, the PPA app may use the specific features associated with a given user to generate recommendations for privacy settings for that user. The features that are included can be, for example, the user's assigned profile, a particular app category, a particular permission, and one or more purposes, or any other relevant collection of such features. For instance, in one embodiment, such a collection of features might be provided as a collection of tuples with each tuple including an app category, a permission, and a purpose. In some embodiments, recommendations may also take into account relevant elements of the user's context (e.g., granting access to the user's location when the user is in a public space, and denying such access when the user is not). In some embodiments the recommendations may come in the form of an "allow", "deny", or "no recommendation" answer for each of these tuples. More complex recommendations may include recommendations to provide limited or even obfuscated access to a given permission, as discussed elsewhere in the present invention, and more generally recommendations associated with non-binary privacy permission controls (e.g., multiple levels of granularity at which access to sensitive data might be granted). In some embodiments, if the set of permission settings available is more limited than what the model is able to predict, such as in the more limited permission model supported in Android 6, which does not allow to differentiate between different types of purposes for which a permission might be requested, the recommendations might come in the form of coarser recommendations, namely recommendations that take into account the different preferences users in a given cluster might have for granting a permission for combinations of possible purposes. In yet other embodiments, recommendations may also take into account the impact of denying a permission on the performance of an app, or the performance of the computing device, as discussed elsewhere in this invention.

In one embodiment where seven different clusters of users have been identified, FIG. 6 shows aggregated permission preferences of users in each cluster organized by app categories. This figure illustrates the typical diversity in privacy preferences associated with different clusters of users, with users within a given cluster having more homogenous preferences for many (app-category, permission) pairs. For instance, users in Cluster 1 are more permissive than users in Cluster 4.

The permission settings and/or privacy settings are intended to capture "user-specific preferences." They are needed when one-size-fits-all configurations would not adequately capture people's privacy preferences, for instance because not everyone in a given population feels comfortable granting a given permission or, more generally, configuring a given privacy setting in the same way. In some embodiments, the invention focuses on privacy preferences that indicate to what extent a user feels comfortable granting a given permission in a particular context. While many environments still lack such settings (e.g. at the time of writing, few if any camera monitoring systems allow users to opt-in to facial recognition, home assistants such as Amazon Echo or Google Chrome don't offer visitors the ability to opt out of having their voice recorded when they visit homes where these devices are deployed), there is a trend towards making such settings available to users, as people have generally been shown to have diverse privacy preferences. In other words, one-size-fits-all default settings are often unlikely to satisfy all users, leading to either overly protective configurations, where a subset of users would have been willing to grant some permissions but the permissions are denied, or overly loose configurations where permissions are granted while some users do not feel comfortable with such granting. This trend is best illustrated by the evolution of mobile app permissions in operating systems such as iOS and Android. It is also visible in browsers and on different social networking sites, which have seen an increase in the number of privacy settings exposed to users. The invention focuses on helping users configure what often amounts to an unmanageably large collection of such privacy settings. The invention focuses on learning people's individual privacy preferences based on one or more sources of information, including information about the preferences users express towards a small number of representative data collection and use scenarios, information that can be used to compare a given user against others to identify groups of like-minded users and leverage their preferences, dialogues with users, settings the user has already configured, information about changes the user has made to some of his or her permission settings as well as other relevant historical data and other sources of information (e.g. using information about a user's privacy settings on Facebook or browser privacy settings to extrapolate his or her privacy preferences in other environments and help configure the corresponding privacy settings in these other environments).

In other embodiments, the modeling of privacy preferences is extended to also include preferences users have to be notified about different privacy practices that pertain to the collection and use of their data in different contexts. This is because often not all users want to be notified about the same data collection and use practices. For instance, one user might want to be notified every time he or she enters a room with camera monitoring systems that use facial recognition, while another user might only want to be notified about the presence of such camera monitoring system only in some particular environments (e.g. bars). One user might only want to be notified once about the presence of such camera monitoring system whereas another might want to be notified each time he or she is within the field of view of such a system. When privacy preference models are extended to include notification preferences and models of people's expectations (e.g. whether a user expects facial recognition to be used in conjunction with footage captured by a camera monitoring system, or whether a user expects his location information to be shared with third parties, or his conversation to be recorded), they can be used by Privacy Assistants to selectively determine when to notify their users about different types of practices. Models about how to notify different people can also be used (e.g. some users might prefer their smartphone to vibrate and display messages; others might prefer a sound and information to be displayed on their smart watch, etc.). As should be clear from the description, the PPA can interface with the user using any suitable input modality. For example, the computing device could have a display screen and the PPA could receive the user's inputs via text or writing; and/or the computing device could have a local or cloud-based speech recognition system that recognizes the user's utterances.

In various embodiments, the user could accept, modify or reject individual privacy recommendations, or accept, modify or reject groups of privacy recommendations.

In addition, in various embodiments, the permissions (and hence the privacy recommendations) may not be limited to "grant" or "deny" access, but could also include obfuscated information, such as information with reduced resolution, frequency or accuracy. For example, instead of getting permission to the user's absolute location (as determined by the computing device), a privacy recommendation for an app might be that it only gets (or gets a certain amount of time) a reduced resolution for the user's location (e.g., within 100 yards, etc.). Similar reductions in resolution could apply to pictures of the user (captured by a camera of the computing device), the quality of sound captured by the computing device, and/or the frequency at which information is collected (e.g., location). Such obfuscated permissions could also be that the app only gets (or only gets a certain amount of time) incorrect or spoofed information (such as incorrect location information, incorrect captured sound, or incorrect contact information from the user's contacts, etc.).

In addition, the permissions could be contingent on other factors or contexts, such as the time of day and/or user location. For example, a contingent permission (and hence a corresponding permission recommendation) could be that an app only gets certain capabilities or information during certain time periods and/or when the user is in certain locations (or not in certain locations), or conversely that the capabilities be denied under specific conditions. For example, location information may only be granted to some apps when the user is not at home or at work, and/or at certain times of day or days of the week. Possible contextual attribute for the permissions for an app, therefore, could be (i) a time of day attribute such that the app is granted or denied permission only during a certain time of day; (ii) a day of week attribute such that the app is granted or denied permission only during a certain day of the week; (iii) a location attribute such that the app is granted or denied permission only when location information from the computing device indicates that the computing device is in a certain location or within a certain geographical area; (iv) an activity attribute such that the app is granted or denied permission when the user is engaged or not engaged in a particular activity (e.g., on a phone call, getting driving navigation instructions, etc.); and (v) an "in company of" attribute such that the app is only granted or denied permission when the user is in the company of or not in the company of certain people or categories of people (determined, e.g., based on location, calendar data, third party venue check-in data, etc.). That way, a number of such nuanced attributes can be used to adequately capture people's often complex privacy preferences. Similar contingent permissions could be applied to other capabilities of the computing device as well, such as its camera, heart rate sensor, and also to capabilities of IoT resources.

The recommended permission setting can also comprise, additionally or alternatively, at least one purpose attribute such that the permission is only granted when the purpose attribute is satisfied. The purpose attribute could be things such as (i) sharing the information made accessible by the permission only with a specific category (or categories) of third parties; or (ii) a guarantee that the information made accessible by the permission will not be shared with specific category (or categories) of third parties.

The recommended permission setting can also comprise, additionally or alternatively, at least one retention attribute such that the permission is only granted when the retention attribute is satisfied. The retention attribute could be, for example, a guarantee that information made accessible by the permission will not be stored for longer than a certain period of time.

In another embodiment, instead of determining privacy recommendation(s) based solely on the assignment of the user to a cluster (or other grouping), the recommendation (s) could be based on matching the user to a collection of clusters and by using privacy recommendation profiles (e.g., collections of recommendations) to identify recommended settings for the apps present on the user device as well as privacy settings associated with other technologies with which the user interacts. For instance, a user might be assigned to a cluster tied to his privacy settings on a social networking site or to questions related to his willingness to share different types of information in the context of social networking sites, and that same user may also have been matched with a cluster from a different collection of clusters related to his privacy preferences in the context of different Internet of Things scenarios. By combining preferences from these two clusters, it might be possible to infer a more complete and/or more accurate set of recommendations for that user. For instance, while profiles tied to each of these two clusters may not be sufficient to recommend a particular privacy setting (e.g., because data available for test subjects in each of these two clusters is not sufficiently conclusive to make a recommendation for the particular privacy setting), knowing that the user belongs to both clusters might provide sufficient support for making a recommendation for the setting. In other embodiments, additional recommendations are identified by aggregating new information collected from the user with information already collected from the user. Such additional information can include particular permission recommendations the user has accepted, rejected or modified over time, additional permissions the user has configured over time (possibly without the intervention of the personalized privacy assistant) and possibly answers to additional personalized questions asked over time by the privacy assistant.

As mentioned above, privacy preference models could be generated using a statistical analysis technique or a machine learning technique, such as a clustering technique. Examples of relevant machine learning and statistical analysis techniques that can be used to develop privacy preference models include: clustering techniques, collaborative filtering techniques, content-based filtering techniques, logistic regression techniques, support vector machine techniques, Bayesian inference techniques, decision tree learning techniques, and more, including ensemble methods that combine multiple models. Some elements of the preference models can also be improved using deep learning techniques. Other machine learning techniques such as unsupervised learning techniques can also contribute to further enriching collective privacy preference models. Other variations of machine learning techniques that can be used to build both collective and individual privacy preference models are disclosed in B. Liu et al., "Reconciling Mobile App Privacy and Usability on Smartphones: Could User Privacy Profiles Help?," 23rd International Conference on the World Wide Web (WWW 2014), July 2014, which is incorporated herein be reference.

In another embodiment, the data center could comprise an app performance database 113 (see FIGS. 2 and 11). This database may include data about how various apps perform when the permissions or settings are changed, such as whether the apps crash or otherwise lose functionality (e.g. a mobile comparison shopping app may continue to work but may not be able scan bar codes anymore if it is denied access to camera functionality, or a restaurant recommendation app may continue to work but may need to request the user to enter his/her location if it is denied access to fine grained location functionality). The app performance data can be collected from any suitable source, such as analysis of the app's code, test data from the app (e.g., running the app and monitoring its behavior, with and without certain permissions), information provided by the app developer (e.g. the app developer might indicate which permissions are absolutely required and/or what happens when different permissions are denied), and/or user app reviews, which may include comments about what happens when the app is denied a particular permission or recommendations to deny some permissions. As such, the privacy recommendations from the remote server 108 of the data center 106 could be based on the both the user's privacy preference model and the app performance data in the app performance database. That is, in one embodiment, the remote server 108 does not make a privacy recommendation if the recommendation would result in the app on the user's computing device crashing or otherwise losing critical functionality, as determined from the data in the app performance database. In that situation, the recommended permission settings might only include recommendations that have not been identified as permission settings that lead to operational problems in the corresponding app, where the operational problems could be causing the app to crash, causing the app to drain battery life at an unacceptable rate, or causing loss or unacceptable degradation of critical functionality in at least one of (i) the app itself, (ii) the computing device, and (iii) other apps installed on the computing device.

In another general aspect, the system is for notifying users about the presence of IoT resources (e.g. devices, apps, services) that collect information about the user and for optionally configuring user-specific privacy settings for these IoT resources, if such settings are available (see FIG. 1B). In some embodiments, the system comprises a Personalized Privacy Assistant (PPA) running on the user's computing device. The PPA is able to discover IoT resources listed in registries that are relevant to the user's current location (e.g. by allowing the PPA to submit to the registries queries requesting lists of IoT resources within the vicinity of the user's current location). For each of these IoT resources, the PPA is also able to query the resource's individual entry in the registry. Such entry typically includes a description of the resource such as who its owner is, what data it collects, how long it retains data and in what form (e.g. anonymized or not), how the data is used, who it is shared with, and whether the resource offers any specific APIs that enable individual users (via their PPA) to configure any available user-specific settings (e.g. each user having access to opt-in, opt-out privacy settings pertaining to one or more data collection and/or use practices). Based on these descriptions and based on models of the user's privacy notification preferences, the PPA can selectively determine whether the presence of the resource and its data collection and use practices warrant notifying the user. Privacy preference models may also be maintained by the PPA to help determine how to notify the user (e.g. different notification preferences such as different preferences for when to be interrupted and/or for one particular notification format over another). For instance, a privacy notification preference model may indicate that some users always want to be notified about the presence of video cameras that use facial recognition, or that some users do not care to be bothered by such notifications unless some other conditions apply (e.g. user being with a particular individual, user being at a sensitive location such as a bar, or when it is the evening, or when data is stored for more than a week). Privacy preference models can also be used to help the user configure any user-specific privacy settings exposed by a given resource (e.g. automatically opting out of some practices on behalf of the user, or recommending to the user that they opt in or opt out of various data collection and/or use practices). As already discussed earlier, privacy preference models, whether to determine when to notify users, how to notify them and about what practices as well as privacy preference models to help users configure user-specific privacy settings can be stored in whole or in part in a data center or on the user's computing device. As already indicated earlier, in general, these models can be developed and refined through a number of different machine learning and/or statistical analysis techniques, which may also involve different forms of dialogues with users (e.g. asking users some questions, requesting users to confirm, clarify, refine, or generalize some of their decisions, nudging users to re-examine prior decisions, etc.). As the PPA helps its user configure user-specific privacy settings exposed by different IoT resources and advertised in IoT resource registries, it accesses user-specific privacy setting APIs advertised in the IoT resource registries for the corresponding IoT resource. These APIs typically support functionality to check the current configuration of a setting for a given user as well as functionality to modify configuration of that setting (e.g. accessing a camera system's API and finding that the user is currently opted into facial recognition for that particular camera system, and then accessing the camera system's API to configure that setting and requesting that the user be opted out instead).

In various implementations, as indicated above, the discovery of the third party IoT resources by the personal privacy assistant is mediated by registries that can be discovered and queried based on the location of the user. The entries in the registries can include descriptions of user-specific privacy settings exposed by a given IoT resource (e.g. opting in, opting out, modulating the granularity at which data is collected and/or stored, limiting the retention of some data, limiting the sharing of data with third parties, limiting potential use of the data, requesting that some data be erased, and more). These descriptions of user-specific privacy settings associated with an IoT resource's entry in the registry can include a description of interfaces (or APIs) available for the personal privacy assistant to read and configure these settings. In some embodiments, user-specific permissions for third party IoT resources are maintained and enforced directly by the IoT resource. In other embodiments, they may be maintained and enforced by external Policy Enforcement functionality. Such functionality keeps track of settings selected by different users and is also responsible to enforce these settings. Such Policy Enforcement functionality is external functionality that acts as a gatekeeper for access to and management of information collected by a given IoT resource, whether that data is stored by the IoT resource itself or in a separate database system.

The servers 108 of the data center 106 may comprise one or more, preferably multi-core, processors and one or more memory units. The memory units may comprise software or instructions that are executed by the processor(s). The memory units that store the software/instructions that are executed by the processor may comprise primary computer memory, such as RAM or ROM, and/or secondary computer memory, such as hard disk drives and solid state drives. The software modules and other computer functions described herein may be implemented in computer software using any suitable computer programming language such as C#/.NET, C, C++, Python, Java, Javascript, Objective C, Ruby and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for configuring permission settings for applications ("apps"), the system comprising:
a data center comprising one or more servers, wherein the one or more servers store at least one model of collective privacy preferences; and
a computing device of a user, wherein the computing device is in communication with the data center via a communications network, wherein the computing device comprises a processor that executes:
at least a first app that requests at least one permission to access sensitive data or functionality associated with the computing device or the user; and
a personal privacy assistant app that:
collects information about the user;
reports at least a portion of the collected information to the data center via the communications network, wherein the one or more servers of the data center use the reported information to identify at least one recommended permission setting for the first app based on the at least one model of collective privacy preferences;
receives the at least one recommended permission setting for the first app from the data center; and
configures the computing device to implement the at least one recommended permission setting for the first app when confidence in the at least one recommended permission exceeds a threshold confidence value.

2. The system of claim 1, wherein the sensitive data or functionality associated with the computing device or the user comprises at least one of:
sensitive on-device data about the user;
sensitive on-device functionality of the computing device;
sensitive external data about the user; and
sensitive external functionality associated with the user.

3. The system of claim 1, wherein:
the at least one recommended permission setting is for a category of apps; and
the personal privacy assistant app configures the computing device to implement the at least one recommended permission setting based on a category for the first app.

4. The system of claim 1, wherein the one or more data centers identify the at least one recommended permission setting for the first app by matching the user to a cluster of users based on the reported portion of collected information about the user, and using the collective privacy preference profile associated with the matched cluster, where the cluster's collective privacy preference profile comprises a collection of recommended permission settings for categories of apps.

5. A system for configuring permission settings for applications ("apps"), the system comprising:
a data center comprising one or more servers, wherein the one or more servers generate at least one model of collective privacy preferences; and
a computing device of a user, wherein the computing device is in communication with the data center via a communications network, wherein the computing device comprises a processor that executes:
at least a first app that requests access to at least one permission to access sensitive data or functionality associated with the computing device or the user; and
a personal privacy assistant app that:
receives the at least one model of collective privacy preferences from the one or more servers of the data center;
collects information about the user;
identifies at least one recommended permission setting for the first app based on the at least one model and such that the recommended permission setting is user-specific; and
configures the computing device to implement the at least one user-specific recommended permission setting.

6. The system of claim 5, wherein the at least one permission is enforced by an operating system of the computing device.

7. The system of claim 5, wherein:
the computing device comprises a second app that requests at least one permission to access sensitive data or functionality associated with the computing device or the user;
the at least one recommended permission setting comprises a first recommended permission setting for the first app and a second recommended permission setting for the second app; and
the personal privacy assistant app configures the computing device to implement the first and second recommended permission settings for the first and second apps after receiving an indication of acceptance or modification from the user for each of the first and second recommended permission settings.

8. The system of claim 7, wherein the personal privacy assistant app receives the indication of acceptance of modification from the user for the first and second recommended permission setting individually.

9. The system of claim 7, wherein the personal privacy assistant app receives the indication of acceptance of modification from the user for the first and second recommended permission setting collectively.

10. The system of claim 5, wherein the personal privacy assistant app configures the computing device to implement the at least one recommended permission setting after receiving an indication of acceptance or modification of the at least one recommended permission setting by the user.

11. The system of claim 5, wherein the personal privacy assistant app automatically configures the computing device to implement the at least one recommended permission setting when confidence in the at least one recommended permission exceeds a threshold confidence value.

12. The system of claim 11, wherein the personal privacy assistant app notifies the user that the personal privacy assistant app automatically configured the computing device to implement the at least one recommended permission setting.

13. The system of claim 5, wherein the personal privacy assistant app provides the at least one recommended permission setting to the user via a user interface with a prompt to accept or reject the at least one recommended permission setting.

14. The system of claim 13, wherein the prompt provided by the user interface additionally comprises an additional option for the user to modify the at least one recommended permission setting.

15. The system of claim 13, wherein the prompt provided by the user interface comprises at least one additional option for the user with respect to the at least one recommended permission setting, wherein the at least one additional option comprises at least one of: modulating a characteristic of the information made accessible by the permission; and falsifying information made available by the permission.

16. The system of claim 15, wherein the characteristic of the information being modulated when the at least one additional option is selected by the user comprises at least one of a resolution of the information, a frequency of collection of the information, a level of anonymization of the information, a level of aggregation of the information.

17. The system of claim 5, wherein the at least one recommended permission setting comprises at least one contextual attribute such that the permission is only implemented when the contextual attribute is satisfied.

18. The system of claim 17, wherein the at least one contextual attribute comprises at least one of:
- a time of day attribute such that the first app is granted or denied permission only during a certain time of day;
- a day of week attribute such that the first app is granted or denied permission only during a certain day of the week;
- a location attribute such that the first app is granted or denied permission only when location information from the computing device indicates that the computing device is at a certain location;
- an activity attribute such that the first app is granted or denied permission when the user is engaged or not engaged in a particular activity; and
- an "in company of" attribute such that the first app is only granted or denied permission when the user is in the company of or not in the company of certain people or categories of people.

19. The system of claim 5, wherein the at least one recommended permission setting comprises at least one purpose attribute such that the permission is only implemented when the purpose attribute is satisfied.

20. The system of claim 19, wherein:
the at least one permission of the first app is to access sensitive data associated with the computing device or the user; and
the purpose attribute comprises at least one of:
- sharing the sensitive data made accessible by the permission with a specific categories of third parties; and
- a guarantee that the sensitive data made accessible by the permission will not be shared with specific categories of third parties.

21. The system of claim 5, wherein the at least one recommended permission setting comprises at least one retention attribute such that the permission is only implemented when the retention attribute is satisfied.

22. The system of claim 21, wherein the retention attribute is a guarantee that information made accessible by the permission will not be stored for longer than a certain period of time.

23. The system of claim 5, wherein:
the at least one model comprises a plurality of user clusters with collective privacy preference profiles associated with each cluster;
the personal privacy assistant matches the user to one of the clusters based on the information collected about the user; and
the personal privacy assistant app determines the at least one recommended permission setting for the first app based on the collective privacy preference profile associated with the matched cluster.

24. The system of claim 23, wherein the one or more servers derive the at least one model of collective privacy preferences based on privacy preference data collected from a population of users.

25. The system of claim 23 wherein the collective matching privacy preference profile is refined by the privacy assistant for the user in the form of an individual privacy preference model using data about the user of the computing device.

26. The system of claim 23, wherein the privacy preference data collected from the population of users comprises privacy preference data collected from at least one member of the population after the member has been provided a privacy nudge.

27. The system of claim 23, wherein the privacy preference data collected from at least one member of the population of users includes a permission setting of the member.

28. The system of claim 23, wherein the privacy preference data collected from at least one member of the population of users includes an answer to a question generated by the personal privacy assistant app.

29. The system of claim 5, wherein the collective privacy preference models have been developed using machine learning or statistical analysis techniques applied to a collection of privacy preferences collected from the population of users in the form of answers to questions.

30. The system of claim 5, wherein the collective privacy preference models have been developed using machine learning or statistical analysis techniques applied to a collection of privacy preferences collected from the population of users in the form of privacy settings used by these users.

31. The system of claim 29, wherein at least some of the privacy preferences comprise at least one feature, wherein the at least one feature comprises at least one of an app category, a purpose for which an app requests a permission, a contextual attribute, and a retention attribute.

32. The system of claim 30, wherein at least some of the privacy preferences comprise at least one feature, wherein the at least one feature comprises at least one of an app category, a purpose for which an app requests a permission, a contextual attribute, and a retention attribute.

33. The system of claim 29, wherein the machine learning technique or statistical analysis technique comprises a clustering technique, such that like-minded test subjects in terms of privacy preferences are clustered together.

34. The system of claim 30, wherein the machine learning technique or statistical analysis technique comprises a clustering technique, such that like-minded test subjects in terms of privacy preferences are clustered.

35. The system of claim 5, wherein the information collected about the user by the personal privacy assistant app comprises at least one of a user privacy preference, a user setting, user demographic information, an answer to a question provided to the user by the personal privacy assistant, historical data collected about the user, data obtained from another system and a user profile.

36. The system of claim 5, wherein:
the computing device comprises a sub-system;
the sub-system comprises at least one of a camera, a microphone and a location determination sub-system; and
the at least one recommended permission setting controls access by the first app to the sub-system or data collected by the sub-system.

37. The system of claim 5, wherein the data center further comprises an app performance database that stores data about operational performance of apps when privacy settings are changed, and wherein the at least one recommended permission setting for the first app is additionally based on data in the app performance database for the first app.

38. The system of claim 37, wherein the app performance database for the first app is obtained from at least one of analyzing code of the first app, monitoring the operational performance of the first app in response to changes to the permission settings, analyzing user reviews of the first app, analyzing patterns of permission setting changes by users, and information from the developer of the first app.

39. The system of claim 5, wherein:
the at least one model comprises a plurality of user clusters with a collective privacy preference profile associated with each cluster;
the personal privacy assistant app identifies the at least one recommended permission setting for the first app by matching the user to one of the clusters based on the information collected about the user; and
the personal privacy assistant app determines the at least one recommended permission setting for the first app based on the collective privacy preference profile associated with the matching cluster.

40. The system of claim 5, wherein:
the personal privacy assistant app identifies a recommended privacy notification for the user based on the least one model of collective privacy preferences; and
the personal privacy assistant app configures the computing device to implement the recommended privacy notification.

41. A method for configuring permission settings for applications ("apps"), wherein each app requests at least one permission to access sensitive data or functionality associated with a computing device of the user or the user, the method comprising:
storing at least one model of collective privacy preferences, wherein the at least one model of collective privacy preferences is generated based on privacy preference data collected from a population of users;
collecting, by a personal privacy assistant app that runs on a computing device of the user, information about the user;
identifying at least one recommended permission setting for a first app on the computing device based on the at least one model and such that the recommended permission setting is user-specific; and
configuring, by the personal privacy assistant app, the computing device to implement at least one user-specific recommended permission setting when confidence in the at least one recommended permission exceeds a threshold confidence value.

42. The method of claim 41, wherein:
one or more remote servers are in communication with the computing device via a communications network;
the method further comprises deriving, by the one or more servers, the at least one model of collective privacy preferences; and
storing the at least one model of collective privacy preferences comprises storing, by the one or more servers, the at least one model of collective privacy preferences.

43. The method of claim 42, wherein:
the step of identifying the at least one recommended permission setting for the first app comprises identifying, by the one or more servers, the at least one recommended permission setting; and
the method further comprises transmitting, by the one or more servers, the at least one recommended permission setting to the computing device via the communications network.

44. The method of claim 42, wherein:
the step of identifying the at least one recommended permission setting for the first app comprises matching, by the one or more servers, the user to one of the user privacy preference profiles based on the information collected about the user; and
the method further comprises determining, by the personal privacy assistant app, the at least one user-specific recommended permission setting for the first app based on the user privacy preference profile that the user is matched to.

45. A method for configuring permission settings for applications ("apps"), wherein each app requests at least one permission to access sensitive data or functionality associated with a computing device of the user or the user, the method comprising:
deriving, by one or more servers of a data center, at least one model of collective privacy preferences, wherein the at least one model of collective privacy preferences is derived based on privacy preference data collected from a population of users;
transmitting, by the one or more servers, the at least one model to the computing device via a communications network;
collecting, by a personal privacy assistant app that runs on the computing device of the user, information about the user;
identifying, by the personal privacy assistant app, at least one recommended permission setting for the first app based on the at least one model and such that the at least one recommended permission setting is user-specific; and
configuring, by the personal privacy assistant app, the computing device to implement at least one user-specific recommended permission setting.

46. The method of claim 42, wherein:
the at least one model comprises a plurality of user privacy preference profiles;
the step of identifying the at least one recommended permission setting comprises matching, by the personal privacy assistant app, the user to one of the user privacy preference profiles based on the information collected about the user; and
the method further comprises determining, by the personal privacy assistant app, the at least one user-specific recommended permission setting for the first app based on the user privacy preference profile that the user is matched to.

47. The method of claim 41, wherein the at least one permission is enforced by an operating system of the computing device.

48. The method of claim 41, further comprising, prior to configuring the computing device, receiving, by the personal privacy assistant app, an indication of acceptance or modification of the at least one user-specific recommended permission setting from the user, wherein the personal privacy assistant app configures the computing device to implement the at least one user-specific recommended permission setting after receiving the indication of acceptance or modification.

49. The method of claim 45, wherein the personal privacy assistant automatically configures the computing device to implement the at least one user-specific recommended permission setting when confidence in the at least one user-specific recommended permission setting exceeds a threshold confidence value.

50. The method of claim 41, further comprising, prior to configuring the computing device, providing, by the personal privacy assistant app, the at least one recommended permission setting to the user via a user interface with a prompt to accept or reject the at least one recommended permission setting.

51. The method of claim 50, wherein the prompt provided by the user interface additionally comprises an additional option for the user to modify the at least one recommended permission setting.

52. The method of claim 50, wherein the prompt provided by the user interface comprises at least one additional option for the user with respect to the at least one recommended permission setting, wherein the at least one additional option comprises at least one of: modulating a characteristic of the information made accessible by the permission; and falsifying information made available by the permission.

53. The method of claim 52, wherein the characteristic of the information being modulated when the at least one additional option is selected by the user comprises at least one of a resolution of the information, a frequency of collection of the information, a level of anonymization of the information, a level of aggregation of the information.

54. The method of claim 45, wherein the at least one recommended permission setting comprises at least one contextual attribute such that the permission is only implemented when the contextual attribute is satisfied.

55. The method of claim 41, wherein the at least one recommended permission setting comprises at least one purpose attribute such that the permission is only implemented when the purpose attribute is satisfied.

56. The method of claim 41, wherein the at least one recommended permission setting comprises at least one retention attribute such that the permission is only implemented when the retention attribute is satisfied.

57. The method of claim 56, wherein the retention attribute is a guarantee that information made accessible by the permission will not be stored for longer than a certain period of time.

58. The method of claim 42, wherein the one or more servers derive the at least one model based on privacy preference data collected from a population of users.

59. The method of claim 58, further comprising refining the at least one model using data about the user of the computing device.

60. The method of claim 58, wherein the privacy preference data collected from the population of users comprises privacy preference data collected from at least one member of the population after the member has been provided a privacy nudge.

61. The method of claim 41, further comprising developing the collective privacy preference models using machine learning or statistical analysis techniques applied to a collection of privacy preferences collected from a population of users in the form of answers to questions.

62. The method of claim 41, further comprising developing the collective privacy preference models using machine learning or statistical learning, techniques applied to a collection of privacy preferences collected from a population of users in the form of privacy settings used by the population of users.

63. The system of claim 61, wherein at least some of the privacy preferences comprise at least one feature, wherein the at least one feature comprises at least one of an app category, a purpose for which an app requests a permission, a contextual attribute, and a retention attribute.

64. The system of claim 62, wherein at least some of the privacy preferences comprise at least one feature, wherein the at least one feature comprises at least one of an app category, a purpose for which an app requests a permission, a contextual attribute, and a retention attribute.

65. The method of claim 61, wherein the machine learning technique comprises a clustering technique, such that like-minded users in terms of privacy preferences are clustered together.

66. The system of claim 62, wherein the machine learning technique comprises a clustering technique, such that like-minded users in terms of privacy preferences are clustered together.

67. The method of claim 58, wherein the one or more servers use a machine learning technique to derive the model based on the collected privacy setting data.

68. The method of claim 67, wherein the machine learning technique comprises a clustering technique, such that like-minded test subjects in terms of privacy preferences are clustered together.

69. The method of claim 58, wherein the one or more servers use a statistical analysis technique to derive the model based on the collected privacy setting data.

70. The method of claim 41, wherein the information collected about the user by the personal privacy assistant comprises at least one of a user privacy preference, a user setting, user demographic information, an answer to a question provided to the user by the personal privacy assistant, historical data collected about the user, data obtained from another system and a user profile.

71. The method of claim 41, wherein:
the computing device comprises a sub-system, wherein the sub-system comprises at least one of a camera, a microphone and a location determination sub-system; and
the he at least one recommended permission setting controls access by the IoT resource to the sub-system or data collected by the sub-system.

72. The method of claim 41, further comprising:
identifying a recommended privacy notification for the user setting based on the least one model of collective privacy preferences; and
configuring, by the personal privacy assistant app, the computing device to implement the recommended privacy notification setting.

73. A system for configuring permission settings for applications ("apps"), the system comprising:
a data center comprising one or more servers, wherein the one or more servers store at least one model of collective privacy preferences; and
a computing device of a user, wherein the computing device is in communication with the data center via a communications network, wherein the computing device comprises a processor that executes:
at least a first app that requests at least one permission to access sensitive data or functionality associated with the computing device or the user; and
a personal privacy assistant app that:
collects information about the user;
reports at least a portion of the collected information to the data center via the communications network, wherein the one or more servers of the data center use the reported information to identify at least one recommended permission setting for the first app based on the at least one model of collective privacy preferences;
receives the at least one recommended permission setting for the first app from the data center;
configures the computing device to implement the at least one recommended permission setting for the first app; and
notifies the user that the personal privacy assistant app automatically configured the computing device to implement the at least one recommended permission setting.

74. A system for configuring permission settings for applications ("apps"), the system comprising:
a data center comprising one or more servers, wherein the one or more servers store at least one model of collective privacy preferences; and
a computing device of a user, wherein the computing device is in communication with the data center via a communications network, wherein the computing device comprises a processor that executes:
at least a first app that requests at least one permission to access sensitive data or functionality associated with the computing device or the user; and
a personal privacy assistant app that:
collects information about the user;
reports at least a portion of the collected information to the data center via the communications network, wherein the one or more servers of the data center use the reported information to identify at least one recommended permission setting for the first app based on the at least one model of collective privacy preferences;
receives the at least one recommended permission setting for the first app from the data center;
provides the at least one recommended permission setting to the user via a user interface with a prompt to accept or reject the at least one recommended permission setting, wherein the prompt provided by the user interface comprises at least one additional option for the user with respect to the at least one recommended permission setting, wherein the at least one additional option comprises at least one of:
modulating a characteristic of the information made accessible by the permission; and
falsifying information made available by the permission: and
configures the computing device to implement the at least one recommended permission setting for the first app.

75. The system of claim 74, wherein the characteristic of the information being modulated when the at least one additional option is selected by the user comprises at least one of a resolution of the information, a frequency of collection of the information, a level of anonymization of the information, a level of aggregation of the information.

76. A system for configuring permission settings for applications ("apps"), the system comprising:
a data center comprising one or more servers, wherein the one or more servers store at least one model of collective privacy preferences; and
a computing device of a user, wherein the computing device is in communication with the data center via a communications network, wherein the computing device comprises a processor that executes:
at least a first app that requests at least one permission to access sensitive data associated with the computing device or the user; and
a personal privacy assistant app that:
collects information about the user;
reports at least a portion of the collected information to the data center via the communications network, wherein the one or more servers of the data center use the reported information to identify at least one recommended permission setting for the first app based on the at least one model of collective privacy preferences;
receives the at least one recommended permission setting for the first app from the data center, wherein:
the at least one recommended permission setting comprises at least one purpose attribute such that the at least one permission is only implemented when the purpose attribute is satisfied; and
the purpose attribute comprises at least one of:
sharing the sensitive data made accessible by the permission with a specific categories of third parties; and
a guarantee that the sensitive data made accessible by the permission will not be shared with specific categories of third parties; and
configures the computing device to implement the at least one recommended permission setting for the first app.

77. A system for configuring permission settings for applications ("apps"), the system comprising:
a data center comprising one or more servers, wherein the one or more servers store at least one model of collective privacy preferences; and
a computing device of a user, wherein the computing device is in communication with the data center via a communications network, wherein the computing device comprises a processor that executes:
at least a first app that requests at least one permission to access sensitive data or functionality associated with the computing device or the user; and
a personal privacy assistant app that:
collects information about the user;
reports at least a portion of the collected information to the data center via the communications network, wherein the one or more servers of the data center use the reported information to identify at least one recommended permission setting for the first app based on the at least one model of collective privacy preferences;
receives the at least one recommended permission setting for the first app from the data center; and
configures the computing device to implement the at least one recommended permission setting for the first app, wherein:
the at least one model comprises a plurality of user clusters with collective privacy preference profiles associated with each cluster;
the one or more servers derive the at least one model of collective privacy preferences based on privacy preference data collected from a population of users;
the privacy preference data collected from the population of users comprises privacy preference data collected from at least one member of the population after the member has been provided a privacy nudge;

the personal privacy assistant matches the user to one of the clusters based on the information collected about the user; and the personal privacy assistant app determines the at least one recommended permission setting for the first app based on the collective privacy preference profile associated with the matched cluster.

78. A method for configuring permission settings for applications ("apps"), wherein each app requests at least one permission to access sensitive data or functionality associated with a computing device of the user or the user, the method comprising:

storing, by a data center, at least one model of collective privacy preferences, wherein the at least one model of collective privacy preferences is generated based on privacy preference data collected from a population of users;

collecting, by a personal privacy assistant app that runs on a computing device of the user, information about the user;

identifying at least one recommended permission setting for a first app on the computing device based on the at least one model and such that the recommended permission setting is user-specific;

configuring, by the personal privacy assistant app, the computing device to implement at least one user-specific recommended permission setting; and refining, by the data center, the at least one model using data about the user of the computing device.

* * * * *